United States Patent
Shahramian et al.

(10) Patent No.: US 10,187,234 B1
(45) Date of Patent: Jan. 22, 2019

(54) DECISION FEEDBACK EQUALIZERS AND METHODS OF DECISION FEEDBACK EQUALIZATION

(71) Applicants: Shayan Shahramian, Richmond Hill (CA); Behzad Dehlaghi, Richmond Hill (CA)

(72) Inventors: Shayan Shahramian, Richmond Hill (CA); Behzad Dehlaghi, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/810,240

(22) Filed: Nov. 13, 2017

(51) Int. Cl.
*H04L 27/01* (2006.01)
*H04B 1/12* (2006.01)
*H04L 25/03* (2006.01)

(52) U.S. Cl.
CPC .............. *H04L 27/01* (2013.01); *H04B 1/12* (2013.01); *H04L 25/03019* (2013.01); *H04L 2025/0349* (2013.01)

(58) Field of Classification Search
CPC .............. H04L 27/01; H04L 25/03019; H04L 2025/0349; H04B 1/12
See application file for complete search history.

(56) References Cited

U.S. PATENT DOCUMENTS

| 8,477,833 B2 | 7/2013 | Bulzacchelli et al. | |
| 9,900,121 B1* | 2/2018 | Takatori | H04J 11/0036 |
| 2010/0202506 A1* | 8/2010 | Bulzacchelli | H04L 25/03057 375/233 |

OTHER PUBLICATIONS

Shahramian et al., Decision Feedback Equalizer Architectures With Multiple Continuous-Time Infinite Impulse Response Filters, IEEE Transactions on Circuits and Systems II: Express Briefs, Jun. 2012, pp. 326-330, vol. 59, No. 6.
Byungsub et al., A 10Gb/s compact Low-Power Serial I/O with DFE-IIR Equalization in 65-nm CMOS, IEEE Journal of Solid-State Circuits, Dec. 2009, pp. 3526-3538, vol. 44, No. 12.
Shahramian et al., Edge-Based Adaptation for a 1 IIR + 1 Discrete-Time Tap DFE Converging in 5 μs, IEEE Journal of Solid-State Circuits, Dec. 2016, pp. 3192-3203, vol. 51, No. 12.
Shahramian et al., A 0.41 pJ/Bit 10 Gb/s Hybrid 2 IIR and 1 Discrete-Time DFE Tap in 28 nm-LP CMOS, IEEE Journal of Solid-State Circuits, Jul. 2015, pp. 1722-1735, vol. 50, No. 7.

(Continued)

*Primary Examiner* — Jaison Joseph
(74) *Attorney, Agent, or Firm* — BCF LLP

(57) ABSTRACT

The present disclosure relates to a 1/K-rate decision feedback equalizer (DFE) and to a decision feedback equalization method. The DFE comprises: (i) a summing circuit configured to combine K intersymbol interference (ISI) cancellation signals with an input signal of the DFE, (ii) K branches each including a reset-to-zero (RZ) latch configured to receive an output signal of the summing circuit according to a clock signal and to produce a RZ signal, and (iii) a feedback circuit including K filters each configured to receive a respective RZ signal from a respective RZ latch and to produce a respective ISI cancellation signal. The method comprises: (i) producing an output signal for K branches based on K cancellation signals and on an input signal, (ii) producing K RZ signals based on the output signal and on a clock signal, and (iii) producing the K ISI cancellation signals based on the K RZ signals.

18 Claims, 13 Drawing Sheets

(56) References Cited

OTHER PUBLICATIONS

Yong et al., A 10Gb/s compact Low-Power Serial I/O with DFE-IIR Equalization in 65-nm CMOS, 2009 IEEE International Solid-State Circuits Conference—Digest of Technical Papers, Feb. 10, 2009, pp. 182-183, 183a.

* cited by examiner

DECISION FEEDBACK EQUALIZERS AND METHODS OF DECISION FEEDBACK EQUALIZATION

TECHNICAL FIELD

The present disclosure relates to the field of feedback equalization at high-data rates and in particular to decision feedback equalizers and methods of decision feedback equalization.

BACKGROUND

High bandwidth data transmission is challenging due to limited channel bandwidth.

Serializer/Deserializer (SerDes) links are commonly used to transfer data over a channel with frequency dependent signal degradation. This signal degradation leads to inter-symbol interference (ISI) which impairs the signal quality at a receiver. One way of compensating for signal distortion due to limited bandwidth is to add equalization functions at the SerDes links. Different equalization techniques may be used to compensate for this ISI in transmitters and receivers. One type of equalizer is a decision feedback equalizer (DFE) in a receiver, for example, which can compensate for ISI and is able to flatten the channel response without amplifying noise or cross-talk. One type of DFEs is an infinite impulse response (IIR) DFE which allows for multiple ISI terms to be removed.

Traditionally, 1/K-rate DFEs (e.g., half-rate, quarter-rate and the like) require data to be multiplexed back to full-rate before removing the ISI. The multiplexing back to full-rate requires additional power and adds a delay in the feedback path of the DFE which is detrimental at high-data rates, where DFEs are most useful.

Therefore, there is a need for improvements to methods and systems that compensate for problems related to ISI cancellation at high-data rates.

SUMMARY

It is an object of the present technology to ameliorate at least some of the inconveniences present in conventional DFEs for cancellation of ISI at high-data rates.

Generally stated, the present technology provides a multiplexer-less (mux-less) DFE in which data does not need to be multiplexed back to full-rate in order to remove the ISI. Removing the necessity for multiplexing the data back to full-rate may help reduce (i) the power requirement for cancellation of ISI and/or (ii) the total feedback delay of DFEs which allows operation at even higher-data rates.

According to an aspect of the present technology, there is provided a device for a 1/K-rate decision feedback equalizer (DFE). The DFE comprises a summing circuit configured to combine K intersymbol interference (ISI) cancellation signals with an input signal of the DFE. The DFE also comprises K branches. Each branch includes a reset-to-zero (RZ) latch configured to receive an output signal of the summing circuit according to a clock signal and to produce a RZ signal. The DFE also comprises a feedback circuit which includes K filters. Each filter is configured to receive a respective RZ signal from a respective RZ latch, and produce a respective ISI cancellation signal from the respective RZ signal.

In some implementations of the present technology, two of the RZ latches may be driven on opposite phases of the clock signal.

In some implementations of the present technology, each branch may further include a set-reset (SR) latch configured to receive the RZ signal of that branch.

In some implementations of the present technology, the DFE may comprise two branches. The respective RZ latches of a first and second one of the two branches may be configured to receive first and second output signals from the summing circuit, respectively, according to the clock signal that may operate at a half duty cycle. The feedback circuit may further comprise a first feedback loop for the first one of the two branches that may be configured for providing a first feedback tap signal from the SR latch of the second one of the two branches to the summing circuit. The summing circuit may be further configured to combine the first feedback tap signal with the input signal of the DFE and with the two ISI cancellation signals for producing the first output signal of the summing circuit. The feedback circuit may further comprise a second feedback loop for the second one of the two branches that may be configured for providing a second feedback tap signal from the SR latch of the first one of the two branches to the summing circuit. The summing circuit may be further configured to combine the second feedback tap signal with the input signal of the DFE and with the two ISI cancellation signals for producing the second output signal of the summing circuit.

In some implementations of the present technology, the first and the second feedback tap signals may be non-return-to-zero (NRZ) signals.

In some implementations of the present technology, the DFE may comprise four branches. Each of the four RZ latches may be configured to receive a respective output of the summing circuit according to the clock signal that may operate at a quarter duty cycle. The feedback circuit may further comprise, for each one of the four branches, a respective feedback loop that may be configured for providing a respective feedback tap signal from the SR latch of at least one other of the four branches to the summing circuit. The summing circuit may be configured to combine the respective feedback tap signal with the input signal of the DFE and with the four ISI cancellation signals for producing the respective output signal of the summing circuit.

In some implementations of the present technology, the DFE may comprise four branches. Each of the four RZ latches may be configured to receive a respective output signal of the summing circuit according to the clock signal that may operate at a half duty cycle. The feedback circuit may further comprise, for each one of the four branches, an AND-gate that may be configured to receive the respective RZ signal according to an other clock signal and to output a respective modified RZ signal. The other clock signal may be such that the respective modified RZ signal is reset to a zero-reference voltage for three quarters of a cycle of the clock signal. The feedback circuit may further comprise, for each one of the four branches, a respective feedback loop that may be configured for providing a respective feedback tap signal from the RZ latch of at least one other of the four branches to the summing circuit. The summing circuit may be further configured to combine the respective feedback tap signal with the input signal of the DFE and with the four ISI cancellation signals for producing the respective output of the summing circuit. Each of the four filters may be configured to receive the respective modified RZ signal from the respective AND-gate and to produce the respective ISI cancellation signal from the respective modified RZ signal.

In some implementations of the present technology, each one of the plurality of filters may be a passive filter.

In some implementations of the present technology, each one of the plurality of filters may be an infinite impulse response (IIR) filter.

According to one aspect of the present technology, there is provided a method implemented in a 1/K-rate decision feedback equalization (DFE) circuit that comprises K branches. The method comprises producing, by the DFE circuit, an output signal for the K branches based on K intersymbol interference (ISI) cancellation signals and on an input signal of the DFE circuit. The method also comprises producing, by the DFE circuit, K return-to-zero (RZ) signals based on the output signal and on a clock signal. The method also comprises producing, by the DFE circuit, each of the K ISI cancellation signals based on a respective one of the K RZ signals.

In some implementations of the present technology, producing each of the K ISI cancellation signals may comprise filtering, by the DFE circuit, the respective one of the K RZ signals.

In some implementations of the present technology, the method may further comprise outputting, by the DFE circuit, the K RZ signals.

In some implementations of the present technology, the method may further comprise producing, by the DFE circuit, each of K non-return-to-zero (NRZ) signals based on a respective one of the K RZ signals.

In some implementations of the present technology, the method may further comprise outputting, by the DFE circuit, the K NRZ signals.

In some implementations of the present technology, producing the output signal may further comprise producing, by the DFE circuit, a respective output signal for each given one of the K branches based on the K ISI cancellation signals, on the input signal of the DFE circuit and on the NRZ signal of another given oven one of the K branches. Also, producing the K RZ signals may further comprise producing, by the DFE circuit, each one of the K RZ signals based on the respective output signal and on the clock signal.

In some implementations of the present technology, producing the K RZ signals based on the output signal and the clock signal may further comprise producing, by the DFE circuit, a first one of the K RZ signals based on the output signal and on a first phase of the clock signal and producing, by the DFE circuit, a second one of the K RZ signals based on the output signal and on a second phase of the clock signal. The first and second phases of the clock signal may be opposite to one another.

In some implementations of the present technology, producing the K RZ signals based on the output signal and on the clock signal may further comprise producing, by the DFE circuit, the K RZ signals based on the respective output signals and on respective clock signals.

In some implementations of the present technology, the method may further comprise operating, by the DFE circuit, the respective clock signals at one of a half duty cycle and a quarter duty cycle.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which.

DETAILED DESCRIPTION

Various aspects of the present disclosure generally address one or more of the problems related to the presence of inter-symbol interference (ISI) at high-data rates. At high-data rates such as 10, 20 or even 30 gigabits per second, for example, half-rate infinite impulse response (IIR) decision feedback equalizer (DFE) architectures are found to be more power-efficient than full-rate structures. Traditionally, IIR DFEs require data to be multiplexed back to full-rate before removing the ISI. Multiplexing the data back to full-rate consumes additional power that is required for operating a multiplexer (MUX). Multiplexing also adds an additional feedback delay which is detrimental at high-data rates since the total feedback delay should be kept below 1 unit interval (UI) of the (full-rate) data stream. In some cases, multiplexing the data back to full-rate may also increase the load on clock buffers of SerDes links since the MUX needs to be driven by a clock.

Figure 1:
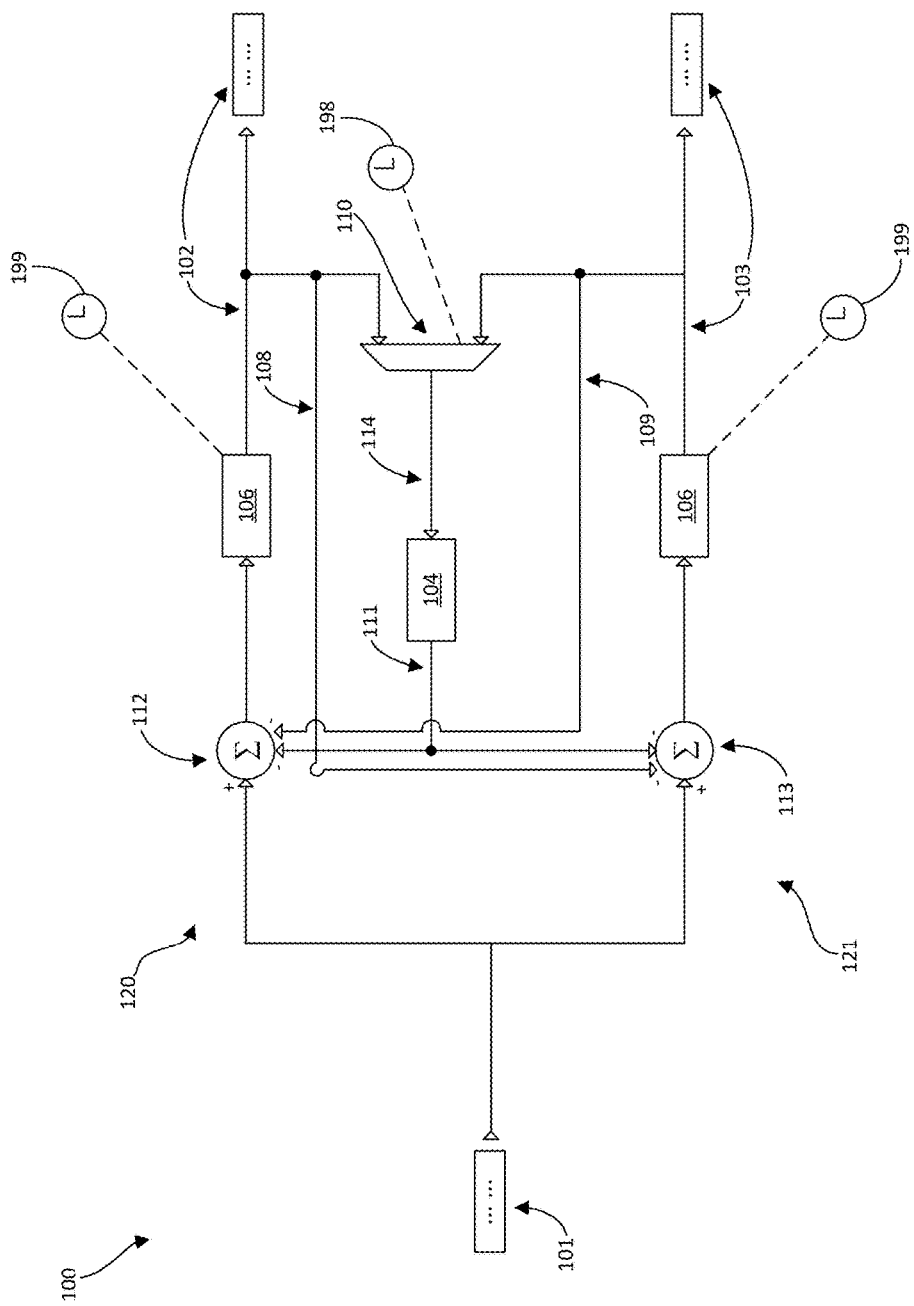
FIG. 1 is a block diagram showing a half-rate architecture of a DFE with an IIR filter and a multiplexer (MUX)

Referring to the drawings, FIG. 1 depicts a half-rate IIR DFE 100 having an even branch 120 and an odd branch 121. The half-rate IIR DFE 100 demultiplexes an input full-rate data signal 101 into two parallel half-rate non-return-to-zero (NRZ) data signals, namely an even NRZ data signal 102 and an odd NRZ data signal 103. In particular, the full-rate data signal 101 is demultiplexed into (i) the even NRZ data signal 102 having the even data bits of the full-rate data signal 101 and (ii) the odd NRZ output data signal 103 having the odd data bits of the full-rate data signal 101.

Two NRZ latches 106 driven by a clock 199, being of half the rate of the clock driving the full-rate data signal 101, are used to sample the full-rate data signal 101. The NRZ latches 106 are driven on opposite phases of the clock 199, so that one of the NRZ latches 106 produces even data bits for the even NRZ data signal 102 while the other one of the NRZ latches 106 produces odd data bits for the odd NRZ data signal 103. Summing circuits 112 and 113 which precede the respective NRZ latches 106 are used to combine different signals of the half-rate IIR DFE 100 with the full-rate data signal 101.

The half-rate IIR DFE 100 also comprises a first feedback loop 108 with a first feedback tap signal (i.e., the even NRZ data signal 102) and a second feedback loop 109 with a second feedback tap signal (i.e., the odd NRZ data signal 103). Both the first and second feedback tap signals are of a conventional discrete type and may be independently adjusted to match a first post-cursor of the channel impulse response. In a half-rate architecture, the previous data bit is decided by the opposite DFE half, so (i) the first feedback tap signal for the odd data path (i.e., the odd branch 121) is fed back from the even data bits and (ii) the second feedback tap signal for the even data path (i.e., the even branch 120) is fed back from the odd data bits. The ISI due to other post-cursors in the channel impulse response is compensated by an ISI cancellation data signal 111 of an IIR filter 104.

It should be noted that feeding one of the half-rate NRZ data signals (i.e., one of the even NRZ data signal 102 and the odd NRZ data signal 103) into the IIR filter 104 is not sufficient to give the desired response, as correct cancellation of the ISI, in this case, requires that the impulse response of the IIR filter 104 be convolved with a complete bit sequence, not just with the even data bits of the even NRZ data signal 102 nor just with the odd data bits of the odd NRZ data signal 103. This is why obtaining a given signal suitable for driving the input of the IIR filter 104 may be challenging.

For that reason, as illustrated in FIG. 1, correct cancellation of the ISI needs the impulse response of the IIR filter 104 to be convolved with the complete bit sequence (a full-rate input) of the full-rate data signal 101. To accomplish this, a 2:1 MUX 110 driven by the clock 198 (driven on both phases of the clock 199) is employed to interleave the even and odd data bits of the even and odd NRZ data signals 102 and 103, respectively, to form a full-rate data signal 114 suitable for driving input of the IIR filter 104.

However, as previously alluded to, multiplexing the even NRZ data signal 102 with the odd NRZ data signal 103 consumes power since the MUX 110 needs to be powered for operating. Also, multiplexing the even NRZ data signal 102 with the odd NRZ data signal 103 adds an additional feedback delay due to the presence of the MUX 110 in the feedback path of the half-rate IIR DFE 100. In addition, load on the clock buffers is increased, since the MUX 110 needs to be driven by the clock 198.

Therefore, in some embodiments of the present technology, there are provided 1/K-rate DFEs (e.g., half-rate, quarter-rate and the like) which do not require multiplexing 1/K-rate data signals and, therefore, do not require the implementation of MUXs in their architectures. Such 1/K-rate DFEs may have reduced power requirements and reduced feedback delays in comparison to a given 1/K-rate DFE that requires multiplexing 1/K-rate data signals back to full-rate for driving input of its filter.

Figure 2:
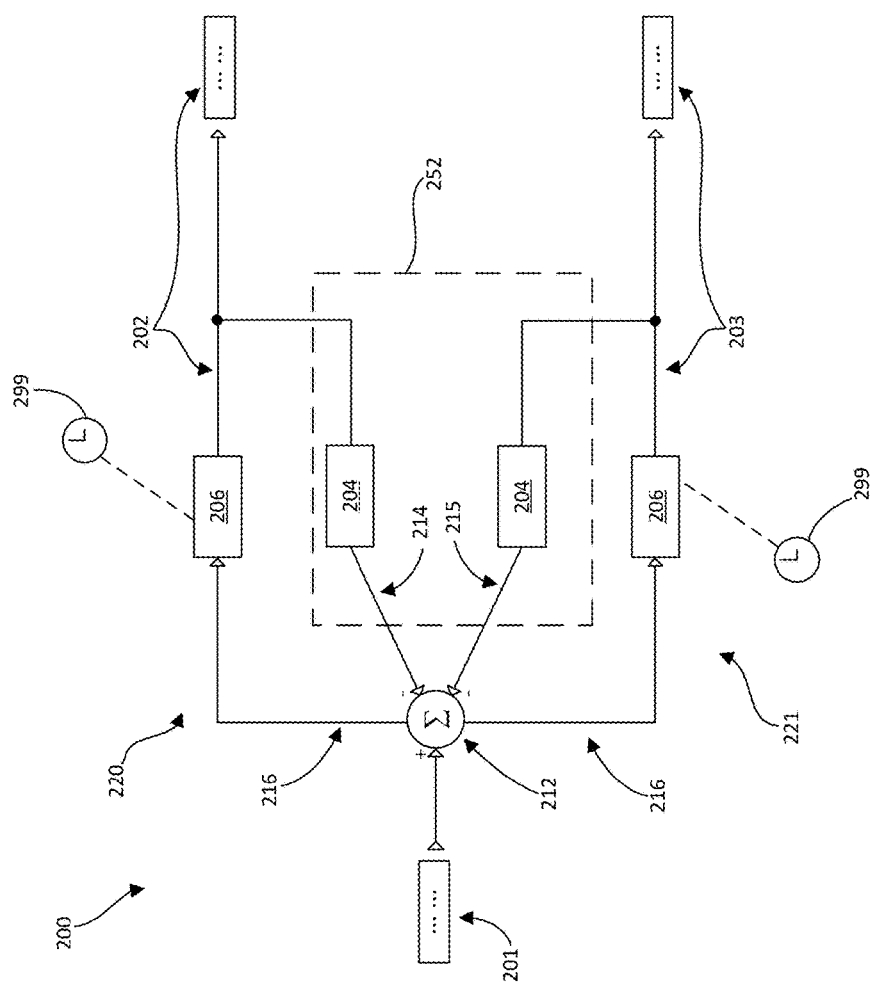
FIG. 2 is a block diagram showing a half-rate architecture of a mux-less DFE according to a first embodiment.

With reference to FIG. 2, there is depicted a half-rate mux-less DFE 200 having a two branches, an even branch 220 and an odd branch 221. Full-rate data signal 201 (i.e., input data stream) is received by the half-rate mux-less DFE 200 and is transmitted to a summing circuit 212 from which the branches 220 and 221 are stemming.

Generally speaking, a given summing circuit may comprise one or more summing amplifiers that are configured to combine voltages present on two or more inputs into one or more output voltages. The given summing circuit may be configured to combine voltages by adding at least some input voltages and/or by subtracting at least some input voltages depending inter alia on voltage signs (i.e., negative or positive) and on various implementations of the present technology.

How the full-rate data signal 201 is received by the half-rate mux-less DFE 200 is not limiting, however, the full-rate data signal 201 may be received via a wired connection such as an optical fiber, for example, or via a wireless connection.

In the embodiment illustrated in FIG. 2, the summing circuit 212 is configured to combine ISI cancellation signals 214 and 215 with the full-rate data signal 201 of the half-rate mux-less DFE 200 for producing an output data signal 216. For example, the summing circuit 212 may be configured to combine the ISI cancellation signals 214 and 215 with the full-rate data signal 201 by subtracting from the full-rate data signal 201 both of the ISI cancellation signals 214 and 215. How the ISI cancellation signals 214 and 215 are produced will be described in further details herein below.

Each one of the branches 220 and 221 comprises a respective reset-to-zero (RZ) latch 206 such as, but not limited to, a strongarm latch, a double-tail latch and the like. Generally speaking, unlike the NRZ latches 106 depicted in FIG. 1, for example, a given RZ latch is configured to receive a given full-rate data signal and to output a given data signal where the signal "resets to zero" between each pulse. In other words, the given signal outputted by the given RZ latch is reset to a given reset-reference voltage between each pulse thereof.

Each RZ latch 206 is driven by a clock 299, being of half the rate of the clock driving the full-rate data signal 201, and is used to sample the output data signal 216 of the summing circuit 212. The RZ latches 206 are driven on opposite phases of the clock 299, so that the RZ latch 206 of the branch 220 produces even data bits for an even RZ data signal 202 while the RZ latch 206 of the branch 221 produces odd data bits for an odd RZ data signal 203. It is contemplated, however, that the RZ latches 206 may be driven by respective clocks having a same cycle period which are phased away from one another by 180 degrees.

The half-rate mux-less DFE 200 also comprises a feedback circuit 252. Generally speaking, the feedback circuit 252 is configured to produce given ISI cancellation signals which in turn are used by the summing circuit 212 for producing the output data signal 216.

To that end, the feedback circuit 252 has two filters 204. In this embodiment, the filters 204 are IIR filters but this does not need to be the case in each and every implementation of the present technology. For example, the filters 204 may be other passive filters than IIR filters. In another example, the filters 204 may be active filters. In yet another example, the filters 204 may be of various orders, such as first order filters, second order filters and the like. The filters 204 are adjustable based on the channel pulse response of the full-rate data signal 201.

One of the filters 204 is associated with the branch 220 and receives the even RZ data signal 202 as input and produces the respective ISI cancellation signal 214, while the other one of the filters 204 is associated with the branch 221 and receives the odd RZ data signal 203 as input and produces the respective ISI cancellation signal 215. Both of the ISI cancellation signals 214 and 215 are then fed back to the summing circuit 212 where they are combined with the full-rate data signal 201 for cancelling at least some of the ISI. By combining the ISI cancellation signals 214 and 215 with the full-rate data signal 201, the summing circuit 212 produces the output data signal 216. For example, the summing circuit 212 may subtract the ISI cancellation signals 214 and 215 from the full-rate data signal 201 for producing the output data signal 216. The output data signal 216 has at least some of the ISI cancelled out in comparison to the full-rate data signal 201.

It should be noted that the half-rate mux-less DFE 200 demultiplexes the full-rate data signal 201 into (i) the even RZ data signal 202 having the even data bits of the full-rate data signal 201 and (ii) the odd RZ data signal 203 having the even data bits of the full-rate data signal 201.

It should also be noted that, the feedback delay of the half-rate mux-less DFE 200 is lower that the feedback delay of the half-rate DFE 100, depicted in FIG. 1, since fewer components are present in the feedback path of the half-rate mux-less DFE 200 than in the feedback path of the half-rate DFE 100 which comprises the MUX 110.

Recalling that one (1) UI of a given signal is inversely proportional to the data rate of the given signal and that a given DFE is limited to processing full-rate data signals having UIs that are larger than the feedback delay of the given DFE, in some implementations of the present technology, the half-rate mux-less DFE 200 may process full-rate data signals having higher data rates than the full-rate data signals processable by the half-rate DFE 100.

Figure 3:
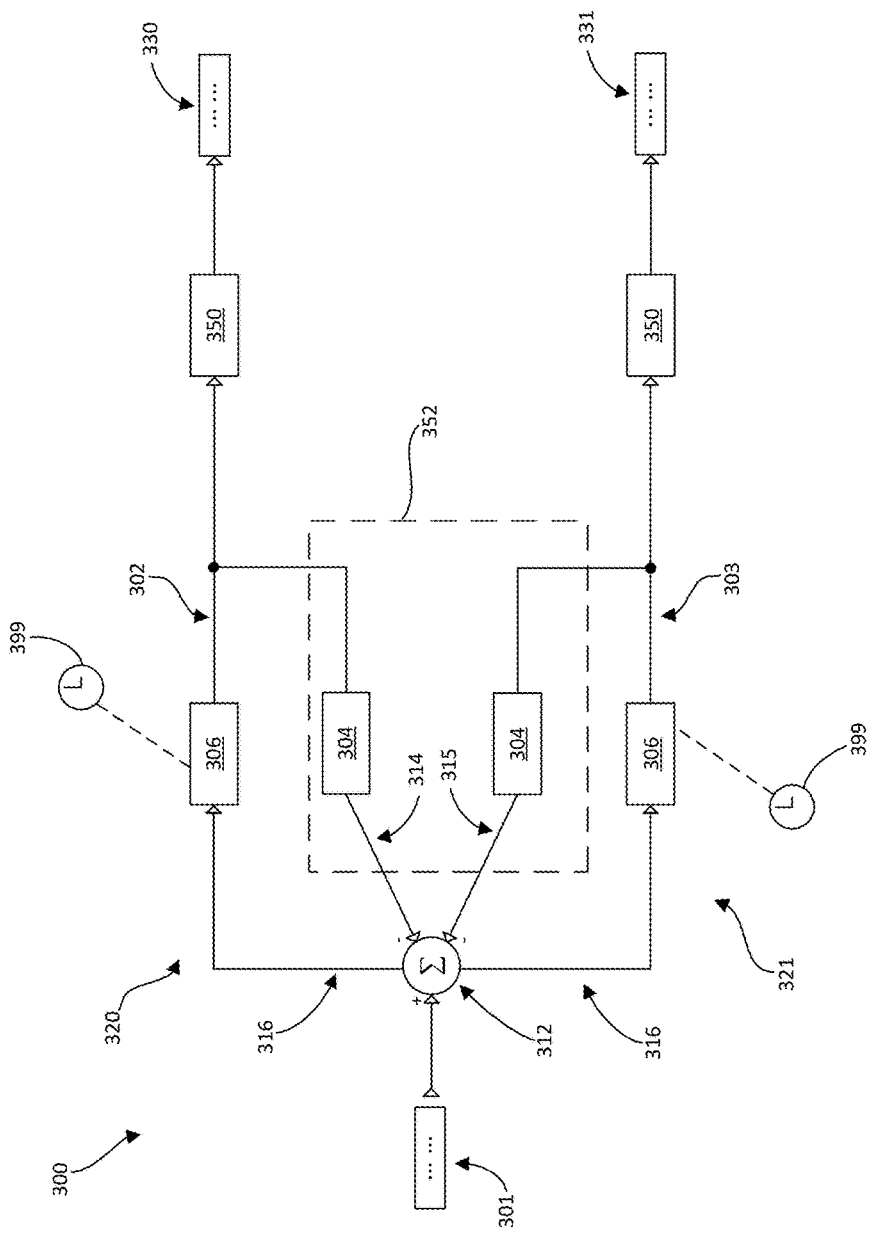
FIG. 3 is a block diagram showing a half-rate architecture of a mux-less DFE with two set-reset (SR) latches according to a second embodiment.

In another embodiment of the present technology, with reference to FIG. 3, there is depicted a half-rate mux-less DFE 300 having two branches 320 and 321. The half-rate mux-less DFE 300 comprises at least some components that are configured and operate similarly to at least some of the components of the half-rate mux-less DFE 200.

A summing circuit 312, RZ latches 306 and a feedback circuit 352 (including filters 304) are configured and operate similarly to the summing circuit 212, the RZ latches 206 and the feedback circuit 252 (including the filters 204), respectively.

For example, the summing circuit 312 may produce an output data signal 316 for each of the branches 320 and 321 similarly to how the summing circuit 212 produces the output data signal 216 for each of the branches 220 and 221.

In another example, the filters 304 may produce respective ISI cancellation signals 314 and 315 similarly to how the filters 204 produce the respective ISI cancellation signals 214 and 215. If the data rate of an full-rate data signal 301 (i.e., input data signal) is the same as the data rate of the full-rate data signal 201, a clock 399 driving the RZ latches 306 on opposite phases thereof may be the same as the clock 299 driving the RZ latches 206 on opposite phases thereof. The output data signal 316 has at least some of the ISI cancelled out in comparison to the full-rate data signal 301.

However, unlike the two branches 220 and 221 of the half-rate mux-less DFE 200, each one of the branches 320 and 321 of the half-rate mux-less DFE 300 further comprises a respective set-reset (SR) latch 350. It is contemplated that the SR latches 350 may be selected from active-high SR latches and/or active-low SR latches, without departing from the scope of the present technology. It should be noted that the SR latches 350 are not part of the feedback circuit 352 (are not in the feedback path of the half-rate mux-less DFE 300) and, therefore, do not increase the feedback delay of the half-rate mux-less DFE 300 if compared to the half-rate mux-less DFE 200.

Generally speaking, a given SR latch may be used to produce a given NRZ data signal based on a given RZ data signal. As such, when the even RZ data signal 302 of the branch 320 is received by the respective SR latch 350, the SR latch 350 of the branch 320 produces an even NRZ data signal 330 having the even data bits of the full-rate data signal 301. Similarly, when the odd RZ data signal 303 of the branch 321 is received by the respective SR latch 350, the SR latch 350 of the branch 321 produces an odd NRZ data signal 331 having the odd data bits of the full-rate data signal 301.

Therefore, it may be said that the half-rate mux-less DFE 300 demultiplexes the full-rate data signal 301 into (i) the even NRZ data signal 330 and (ii) the odd NRZ output data signal 331.

Figure 4:
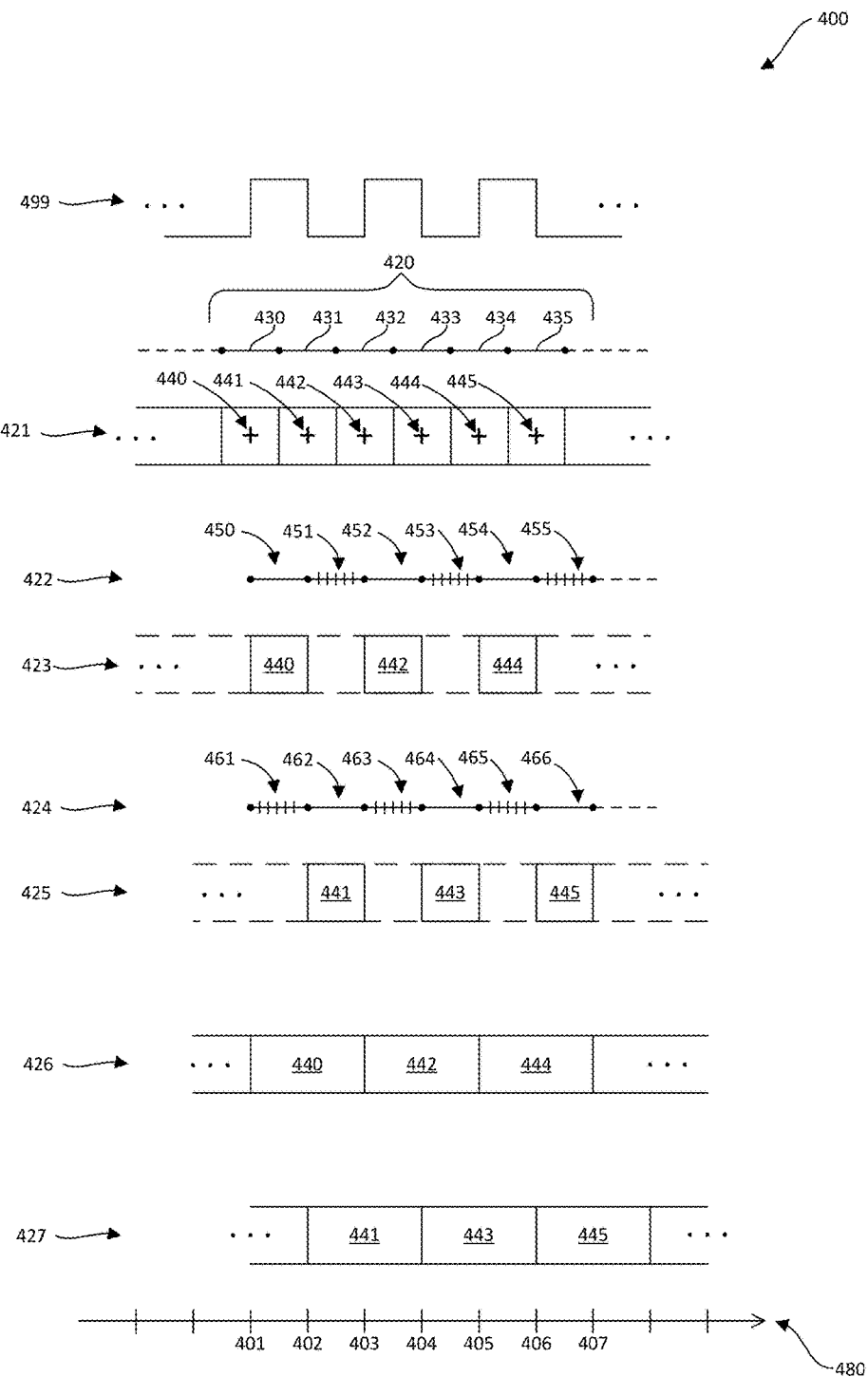
FIG. 4 is a timing diagram for the half-rate mux-less DFE of FIG. 3.

With reference to FIG. 4, there is depicted a timing diagram 400 showing how at least some data signals of the half-rate mux-less DFE 300 are associated in time. A time axis 480 is depicted at the bottom of the timing diagram 400 and a clock timeline 499 of the clock 399 is depicted at the top of the timing diagram 400. The time axis 480 is provided with arbitrarily chosen instants 401, 402, 403, 404, 405, 406 and 407 which are distant from one another by a time length of one (1) UI of the full-rate data signal 301.

It should be noted that the timing diagram 400 is depicted for explanation purposes only. In different implementations of the present technology, timing of at least some data signals and/or at least of some events described herein below with reference to FIG. 4 may not correspond exactly to what is illustrated by the timing diagram 400.

A timeline 421 represents in time the output data signal 316 of the summing circuit 312. The output data signal 316 is illustratively separated into a plurality of pulse periods 420 associated with respective pulses of the output data signal 316. Since pulses of the output data signal 316 are representative of respective data bits of the output data signal 316, the plurality of pulse periods 420 are associated with respective data bits of the output data signal 316.

The plurality of pulse periods 420 comprises pulse periods 430, 431, 432, 433, 434 and 435 which are immediately sequential in time in that order. As such, the pulse periods 430, 432 and 434 are, for example, associated with respective even data bits of the output data signal 316 while the pulse periods 431, 433 and 435 are associated with respective odd data bits of the output data signal 316.

Operation timeline 422 represents in time evaluation phases 450, 452 and 454 and reset phases 451, 453 and 455 of the RZ latch 306 of the branch 320. The RZ latch 306 of the branch 320 is driven by the clock 399 such that it evaluates the output data signal 316 according to the rising edges of the clock timeline 499 in the present example.

For example, the evaluation phases 450, 452 and 454 begin at the instants 401, 403 and 405 in accordance with the rising edges of the clock timeline 499 and end at the instants 402, 404 and 406 in accordance with the falling edges of the clock timeline 499. In the same example, the reset phases 451, 453 and 455 begin at the instants 402, 404 and 406 in accordance with the falling edges of the clock timeline 499 and end at the instants 403, 405 and 407 in accordance with the rising edges of the clock timeline 499.

Operation timeline 424 represents in time evaluation phases 462, 464 and 466 and reset phases 461, 463 and 455 of the RZ latch 306 of the branch 321. The RZ latch 306 of the branch 331 is driven on the opposite phase of the clock 399 with respect to the RZ latch 306 of the branch 330. This means that the RZ latch 306 of the branch 321 evaluates the output data signal 316 according to the falling edges of the clock 399, instead of an evaluation according to the rising edges of the clock timeline 499.

For example, the evaluation phases 462, 464 and 466 begin at the instants 402, 404 and 406 in accordance with the falling edges of the clock 399 and end at the instants 403, 405 and 407 in accordance with the rising edges of the clock timeline 499. In the same example, the reset phases 461, 463 and 465 begin at the instants 401, 403 and 405 in accordance with the rising edges of the clock 399 and end at the instants 402, 404 and 406 in accordance with the falling edges of the clock timeline 499.

It should be noted that a phase of the clock 399 is adjusted such that values of respective data bits of the output data signal 316 are sampled at the center of "the eye" of the full-rate data signal 301. As such, the rising and falling edges of the clock timeline 499 are illustrated as aligned with the middle or in proximity to the middle of each one of the plurality of pulse periods 420.

It is contemplated that the phase of the clock 399 may be adjusted by a clock-and-data recovery circuit (not shown) or by any other suitable mechanism for driving the RZ latches 306 and sampling values of respective data bits of the output data signal 316. Also, in embodiments where given RZ latches of a given 1/K-rate DFE are driven by respective clocks being phased away from one another by 360/K degrees, the given 1/K-rate DFE may further comprise auxiliary calibration circuits for ensuring that the respective clocks are appropriately phased away with respect to one another.

A timeline 423 represents in time the even RZ data signal 302 of the RZ latch 306 of the branch 320. At the instant 401, the evaluation phase 450 of the RZ latch 306 of the branch 320 begins and a value 440 of the output data signal 316 is sampled and is transmitted as part of the even RZ data signal 302 until the reset phase 451 begins at the instant 402.

The value 440 is representative of a given even data bit associated with the pulse period 430. For example, the value 440 may correspond to a voltage of the output data signal 316 sampled at the instant 401 which is representative of the given even data bit associated with the pulse period 430 and where the given even data bit may be either a logical "1" or a logical "0".

At the instant 402, the reset phase 451 begins and the RZ latch 306 of the branch 320 "resets to zero" the even RZ data signal 302 until the evaluation phase 452 begins at the instant 403. This means that the even RZ data signal 302 is reset to a voltage of zero, or to any other suitable reset-reference voltage, between the instants 402 and 403.

At the instant 403, the evaluation phase 452 begins and a value 442 of the output data signal 316 is sampled and is transmitted as part of the even RZ data signal 302 until the reset phase 453 begins at the instant 404. The value 442 is representative of another given even data bit associated with the pulse period 432 similarly to how the value 440 is representative of the given even data bit associated with the pulse period 430.

Likewise, at the instant 404, the reset phase 453 begins and the RZ latch 306 of the branch 320 "resets to zero" the even RZ data signal 302 until the evaluation phase 454 begins at the instant 405. The RZ latch 306 of the branch 320 "resets to zero" the even RZ data signal 302 during the reset phase 453 similarly to how the RZ latch 306 of the branch 320 "resets to zero" the even RZ data signal 302 during the reset phase 451.

Similarly, at the instant 405, the evaluation phase 454 begins and a value 444 of the output data signal 316 is sampled and is transmitted as part of the even RZ data signal 302 until the reset phase 455 begins at the instant 406. The value 444 is representative of yet another given even bit associated with the pulse period 434 similarly to how the value 440 is representative of the given even data bit associated with the pulse period 430.

It should be noted that the values 440, 442 and 444, which are representative of respective even data bits of the output data signal 316, are illustratively spaced apart in the timeline 423 by given "reset-to-zero" periods due to the reset phases 451, 453 and 455 of the RZ latch 306 of the branch 320 during which the output of the RZ latch 306 of the branch 320 (i.e., the even RZ data signal 302) is returned to the reset-reference voltage. Therefore, the even RZ data signal 302 is a given RZ data signal that has the even data bits (represented by the values 440, 442 and 444) of the output data signal 316.

A timeline 425 represents in time the odd RZ data signal 303 of the RZ latch 306 of the branch 321. The output data signal 316 is sampled by RZ latch 306 of the branch 321 during the respective evaluation phases 462, 464 and 466. It should be noted that the evaluation phases 462, 464 and 466 of the RZ latch 306 of the branch 321 occur during the reset phases 451, 453 and 455, respectively, of the RZ latch 306 of the branch 320. In other words, since the RZ latch 206 of the branch 331 is driven on the opposite phase of the clock 399 with respect to the RZ latch 306 of the branch 330, when the RZ latch 306 of the branch 330 is resetting, the RZ latch 306 of the branch 331 is evaluating and vice versa.

As a result, during the evaluation phases 462, 464 and 466 of the RZ latch 306 of the branch 321, respective values 441, 443 and 445 are sampled and transmitted as part of the odd RZ data signal 303. The values 441, 443 and 445 are representative of respective odd data bits associated with the pulse periods 431, 433 and 435, respectively.

The values 441, 443 and 445, which are representative of respective odd data bits of the output data signal 316 are illustratively spaced apart in the timeline 425 by given "reset-to-zero" periods due to the reset phases 461, 463 and 465 of the RZ latch 306 of the branch 321 during which the output of the RZ latch 306 of the branch 321 (i.e., the odd RZ data signal 303) is returned to the reset-reference voltage. Therefore, the odd RZ data signal 303 is a given RZ data signal that has the odd data bits (represented by the values 441, 443 and 445) of the output data signal 316.

A timeline 426 represents in time the even NRZ data signal 330 of the SR latch 350 of the branch 320. At the instant 401, the value 440 of the even RZ data signal 302 is received by the respective SR latch 350 which transmits the value 440 as part of the even NRZ data signal 330. At the instant 402, even though the value of the reset-reference voltage of the even RZ data signal 302 is received by the respective SR latch 350, the respective SR latch 350 continues to transmit the value 440 as part of the even NRZ data signal 330. The respective SR latch 350 transmits the value 440 as part of the even NRZ data signal 330 until the value 442 of the even RZ data signal 302 is received at the instant 403 at which the respective SR latch 350 transmits the value 442 as part of the even NRZ data signal 330. The respective SR latch 350 transmits the value 442 as part of the even NRZ data signal 330 until the value 444 of the even RZ data signal 302 is received at the instant 405 at which the respective SR latch 350 transmits the value 444 as part of the even NRZ data signal 330.

Therefore, the even NRZ data signal 330 is a given NRZ data signal (i.e., without "reset-to-zero" periods) that has the even data bits (represented by the values 440, 442 and 444) of the output data signal 316. It should be noted that each even data bit represented by the values 440, 442 and 444 are associated with respective pulse periods of the even NRZ data signal 330 which are twice as long as the respective pulse periods 430, 432 and 434 of the output data signal 316.

A timeline 427 represents in time the odd NRZ data signal 331 of the SR latch 350 of the branch 321. At the instant 402, the value 441 of the odd RZ data signal 303 is received by the respective SR latch 350 which transmits the value 441 as part of the odd NRZ data signal 331. At the instant 403, the value of the reset-reference voltage of the odd RZ data signal 303 is received by the respective SR latch 350 which continues to transmit the value 441 as part of the odd NRZ data signal 331. The respective SR latch 350 transmits the value 441 as part of the odd NRZ data signal 331 until the value 443 of the odd RZ data signal 303 is received at the instant 404 at which the respective SR latch 350 transmits the value 443 as part of the odd NRZ data signal 331. The respective SR latch 350 transmits the value 443 as part of the odd NRZ data signal 331 until the value 445 of the odd RZ data signal 303 is received at the instant 406 at which the respective SR latch 350 transmits the value 445 as part of the odd NRZ data signal 331.

Therefore, the odd NRZ data signal 331 is a given NRZ data signal that has the odd data bits (represented by the values 441, 443 and 445) of the output data signal 316. It should be noted that each odd data bit represented by the values 440, 442 and 444 are associated with respective pulse periods of the odd NRZ data signal 331 which are twice as long as the respective pulse periods 431, 433 and 435 of the output data signal 316.

It is contemplated that at least some data signals of the half-rate mux-less DFE 200 may be associated in time similarly to how at least some data signals of the half-rate mux-less DFE 300 are associated in time. Therefore, a timing diagram (not depicted) for the half-rate mux-less DFE 200 may be similar to the timing diagram 400, depicted in FIG. 4, for the half-rate mux-less DFE 300 but without the timelines 426 and 427.

Figure 5:
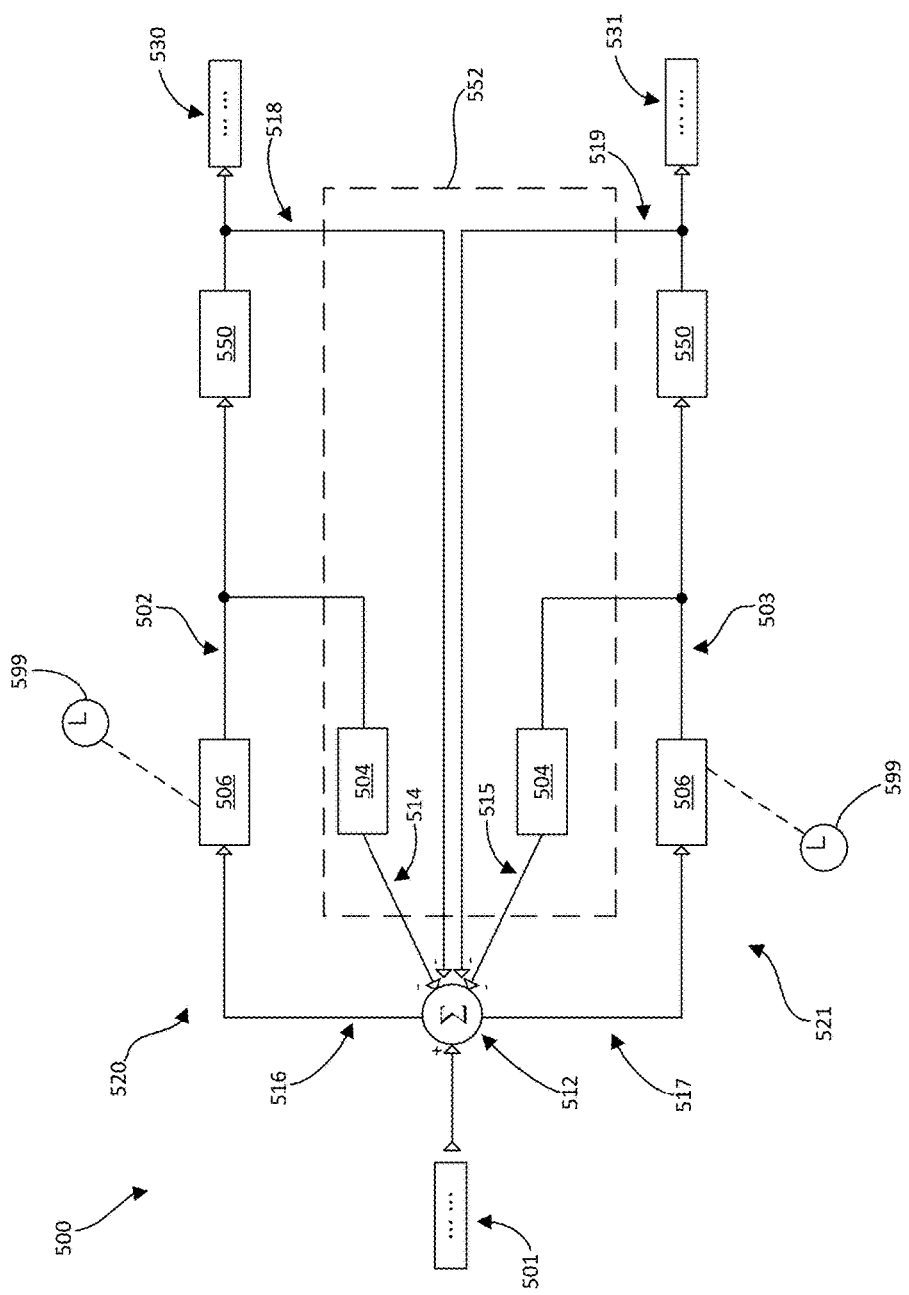
FIG. 5 is a block diagram showing a half-rate architecture of a mux-less DFE with two SR latches and two feedback loops according to a third embodiment.

With reference to FIG. 5, in yet another embodiment of the present technology, there is depicted a half-rate mux-less DFE 500 having two branches 520 and 521. The half-rate mux-less DFE 500 comprises at least some components that are configured and operate similarly to at least some of the components of the half-rate mux-less DFE 300.

For example, RZ latches 506, RS latches 550, filters 504 are configured and operate similarly to the RZ latches 306, the RS latches 350, the filters 304, respectively. If an full-rate data signal 501 (i.e., input data signal) has the same data rate as the data rate of the full-rate data signal 301, a clock 599 driving the RZ latches 506 on opposite phases thereof is the same as the clock 399 driving the RZ latches 306 on opposite phases thereof.

However, unlike the half-rate mux-less DFE 300 having the feedback circuit 352 and the summing circuit 312, the half-rate mux-less DFE 500 has a feedback circuit 552 and a summing circuit 512. How the half-rate mux-less DFE 500 is configured to produce an even NRZ data signal 530 and an odd NRZ data signal 531 as well as how the feedback circuit 552 and the summing circuit 512 are configured and operate will be described in more details herein below.

In addition to the filters 504 providing respective ISI cancellation signals 514 and 515 to the summing circuit 512, the feedback circuit 552 also comprises a first feedback loop 518 and a second feedback loop 519. The first feedback loop 518 provides a first feedback tap signal (i.e., the even NRZ data signal 530) from the SR latch 550 of the branch 520 to the summing circuit 512. The second feedback loop 519 provides a second feedback tap signal (i.e., the odd NRZ data signal 531) from the SR latch 550 of the branch 521 to the summing circuit 512.

The summing circuit 512 is configured to produce distinct output signals for each one of the branches 520 and 521. For example, the summing circuit 512 is configured to produce an output data signal 516 for the branch 520 and an output data signal 517 for the branch 521.

In more details, based on (i) the ISI cancellation signal 514, (ii) the ISI cancellation signal 515, (iii) the first feedback tap signal of the first feedback loop 518, (iv) the second feedback tap signal of the second feedback loop 519 and (v) the full-rate data signal 501, the summing circuit 512 is configured to produce the respective output data signals 516 and 517 for the branches 520 and 521. Therefore, the summing circuit 512 is configured to combine distinct combinations of its input signals for producing distinct output signals.

The summing circuit 512 is configured to combine the second feedback tap signal of the second feedback loop 519 as well as the ISI cancellation signals 514 and 515 with the full-rate data signal 501 for producing the output data signal 516. For example, the summing circuit 512 may be configured to subtract the second feedback tap signal of the second feedback loop 519 as well as the ISI cancellation signals 514 and 515 from the full-rate data signal 501 for producing the output data signal 516.

It should be noted that the second feedback tap signal of the second feedback loop 519 is used to compensate for a first post-cursor of the channel pulse response while the ISI cancellation signals 514 and 515 are used to compensate for other post-cursors in the channel pulse response.

The summing circuit 512 is configured to combine the first feedback tap signal of the first feedback loop 518 as well as the ISI cancellation signals 514 and 515 with the full-rate data signal 501 for producing the output data signal 517. For example, the summing circuit 512 may be configured to subtract the first feedback tap signal of the first feedback loop 518 as well as the ISI cancellation signals 514 and 515 from the full-rate data signal 501 for producing the output data signal 517.

It should be noted that the first feedback tap signal of the first feedback loop 518 is used to compensate for a first post-cursor of the channel pulse response while the ISI cancellation signals 514 and 515 are used to compensate for other post-cursors in the channel pulse response.

It should also be noted that the RZ latch 506 of the branch 520 is configured to produce an even RZ data signal 502 based on the output signal 516 similarly to how the RZ latch 306 of the branch 320, depicted in FIG. 3, is configured to produce the even RZ data signal 302 based on the output signal 316. Also, the RZ latch 506 of the branch 521 is configured to produce an odd RZ data signal 503 based on the output signal 517 similarly to how the RZ latch 306 of the branch 321 is configured to produce the odd RZ data signal 303 based on the output signal 316.

It should also be noted that the RS latches 550 are configured to produce the even and odd NRZ data signals 530 and 531, respectively, based on the even and odd RZ data signals 502 and 503, respectively, similarly to how the RS latches 350 are configured to produce the even and odd NRZ data signals 330 and 331, respectively, based on the even and odd RZ data signals 302 and 303, respectively.

It is contemplated that at least some data signals of the half-rate mux-less DFE 500 may be associated in time similarly to how at least some data signals of the half-rate mux-less DFE 300 are associated in time. Therefore, a timing diagram (not shown) for the half-rate mux-less DFE 500 may be similar to the timing diagram 400, depicted in FIG. 4, for the half-rate mux-less DFE 300.

Figure 6:
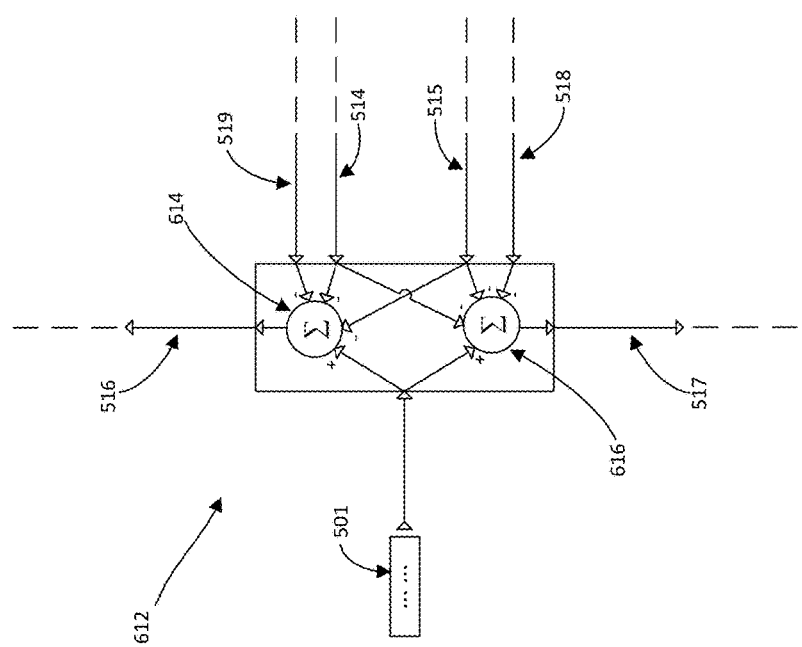
FIG. 6 is an alternative embodiment of a summing circuit of the mux-less DFE of FIG. 5.

In a non-limiting example, with reference to FIG. 6, the half-rate mux-less DFE 500 may comprise a summing circuit 612, as an embodiment of the summing circuit 512. The summing circuit 612 comprises two summing sub-circuits 614 and 616 which are configured to receive distinct combinations of input signals of the summing circuit 612.

For example, the summing sub-circuit 614 is configured to receive the full-rate data signal 501, the second feedback tap signal (i.e., the odd NRZ data signal 531) of the second feedback loop 519 as well as the ISI cancellation signals 514 and 515. As such, the summing sub-circuit 614 is configured to combine the second feedback tap signal of the second feedback loop 519 as well as the ISI cancellation signals 514 and 515 with the full-rate data signal 501 for producing the output data signal 516.

In the same example, the summing sub-circuit 616 is configured to receive the full-rate data signal 501, the first feedback tap signal (i.e., the even NRZ data signal 530) of the first feedback loop 518 as well as the ISI cancellation signals 514 and 515. As such, the summing sub-circuit 616 is configured to combine the first feedback tap signal of the first feedback loop 518 as well as the ISI cancellation signals 514 and 515 with the full-rate data signal 501 for producing the output data signal 517.

It is contemplated that the summing circuit 612 may comprise, in addition to the summing sub-circuits 614 and 616, an auxiliary summing sub-circuit (not shown) for combining the ISI cancellation signals 514 and 515 into a common ISI cancellation signal (not shown) which may then be received by each one of the summing sub-circuits 614 and 616. As such, the summing sub-circuit 614 may combine the common ISI cancellation signal and the second feedback tap signal (i.e., the odd NRZ data signal 531) of the second feedback loop 519 with the full-rate data signal 501. Similarly, the summing sub-circuit 616 may combine the common ISI cancellation signal and the first feedback tap signal (i.e., the even NRZ data signal 530) of the first feedback loop 518 with the full-rate data signal 501.

It is also contemplated that the summing sub-circuits 614 and 616 may be integrated into the respective RZ latches 506. This means that the combination of the second feedback tap signal of the second feedback loop 519 as well as the ISI cancellation signals 514 and 515 with the full-rate data signal 501 for producing the output data signal 516 may be performed in the RZ latch 506 of the branch 520. This also means that the combination of the first feedback tap signal of the first feedback loop 518 as well as the ISI cancellation signals 514 and 515 with the full-rate data signal 501 for producing the output data signal 517 may be performed in the RZ latch 506 of the branch 521

Figure 7:
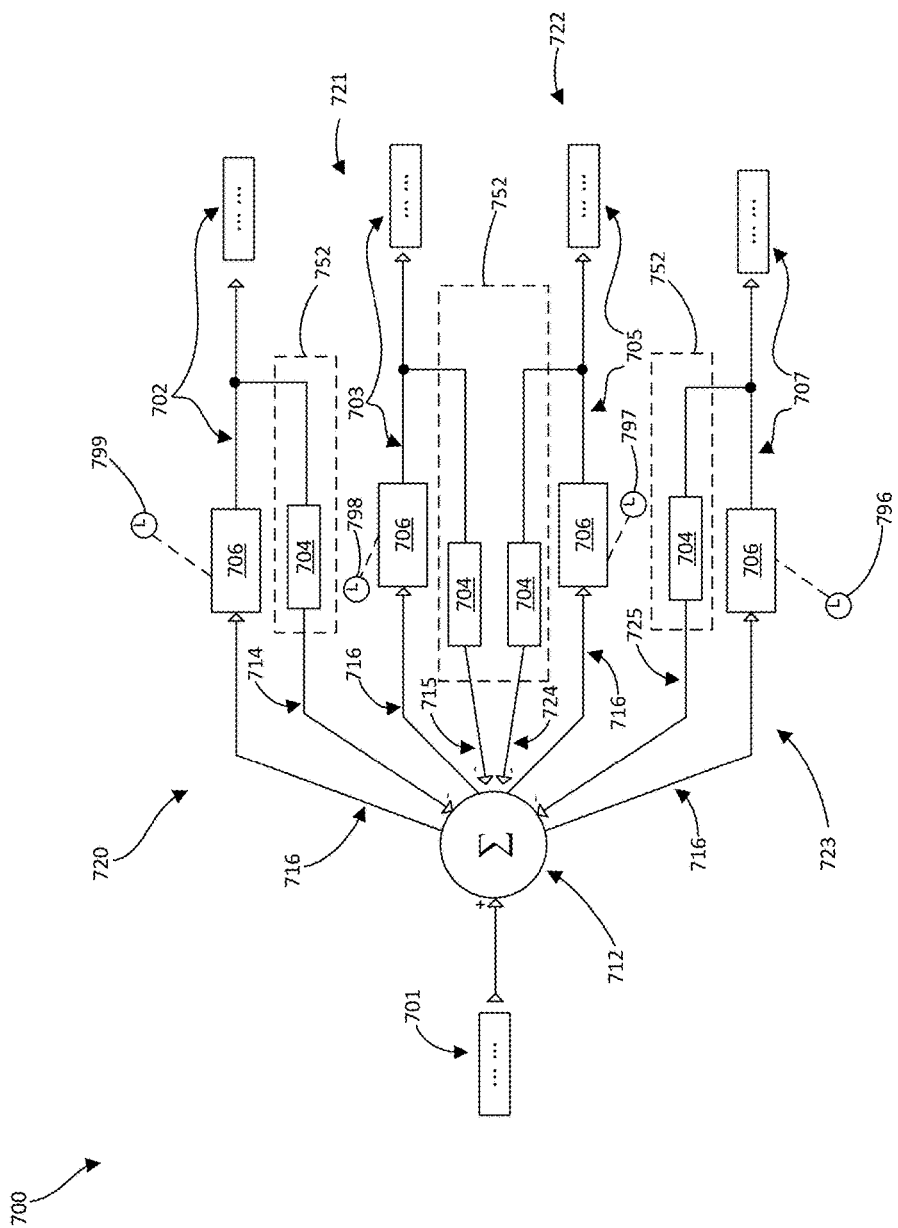
FIG. 7 is a block diagram showing a quarter-rate architecture of a mux-less DFE according to a fourth embodiment.

In another embodiment of the present technology, with reference to FIG. 7, there is depicted a quarter-rate mux-less DFE 700 having four branches 720, 721, 722 and 723. Full-rate data signal 701 (i.e., input data signal) is received by the quarter-rate mux-less DFE 700 and transmitted to a summing circuit 712. Each one of the branches 720, 721, 722 and 723 comprises a respective RZ latch 706 which is configured to receive an output data signal 716 from the summing circuit 712.

The RZ latches 706 are driven by respective clocks 799, 798, 797 and 796, which are of quarter the rate of the clock driving the full-rate data signal 701, and are used to sample the output data signal 716 of the summing circuit 712. The clock 799 is phased away from the clock 798 by 25% of its cycle (90 degrees). The clock 798 is phased away from the clock 797 by 25% of its cycle. The clock 797 is phased away from the clock 796 by 25% of its cycle.

It is to be noted that the clocks 799, 798, 797 and 796 are configured to operate at a 25% duty cycle (i.e., a quarter duty cycle) which means that the respective RZ latches 706 are driven by the respective clocks 799, 798, 797 and 796 to sample the output data signal 716 of the summer circuit 712 during a quarter of each cycle of the respective one of the clocks 799, 798, 797 and 796.

The quarter-rate mux-less DFE 700 also comprises a feedback circuit 752. The feedback circuit 752 has four filters 704. In this embodiment, the filters 704 are IIR filters but, as previously mentioned, this does not need to be the case in each and every implementation of the present technology. The filters 704 are configured and operate similarly to the filters 504 depicted in FIG. 5.

The filter 704 for the branch 720 receives a first RZ data signal 702 as input from the RZ latch 706 of the branch 720 and produces a respective ISI cancellation signal 714. The filter 704 for the branch 721 receives a second RZ data signal 703 as input from the RZ latch 706 of the branch 721 and produces a respective ISI cancellation signal 715. The filter 704 for the branch 722 receives the a third RZ data signal 705 as input from the RZ latch 706 of the branch 722 and produces a respective ISI cancellation signal 724. The filter 704 for the branch 723 receives a fourth RZ data signal 707 as input from the RZ latch 706 of the branch 723 and produces a respective ISI cancellation signal 725. All four of the ISI cancellation signals 714, 715, 724 and 725 are then received by the summing circuit 712 where they are combined with the full-rate data signal 701 for cancelling at least some of the ISI. By combining the ISI cancellation signals 714, 715, 724 and 725 with the full-rate data signal 701, the summing circuit 712 produces the output data signal 716. The output data signal 716 has at least some of the ISI cancelled out in comparison to the full-rate data signal 701.

The quarter-rate mux-less DFE 700 demultiplexes the full-rate data signal 701 into the first, second, third and fourth RZ data signals 702, 703, 705 and 707. The first RZ data signal 702 has a first data bit and every fourth data bit after the first data bit of the full-rate data signal 701. The second RZ data signal 703 has a second data bit (immediately sequential data bit after the first data bit of the full-rate data signal 701) and every fourth data bit after the second data bit of the full-rate data signal 701. The third RZ data signal 705 has a third data bit (immediately sequential data bit after the second data bit of the full-rate data signal 701) and every fourth data bit after the third data bit of the full-rate data signal 701. The fourth RZ data signal 707 has a fourth data bit (immediately sequential data bit after the third data bit of the full-rate data signal 701) and every fourth data bit after the fourth data bit of the full-rate data signal 701.

Figure 8:
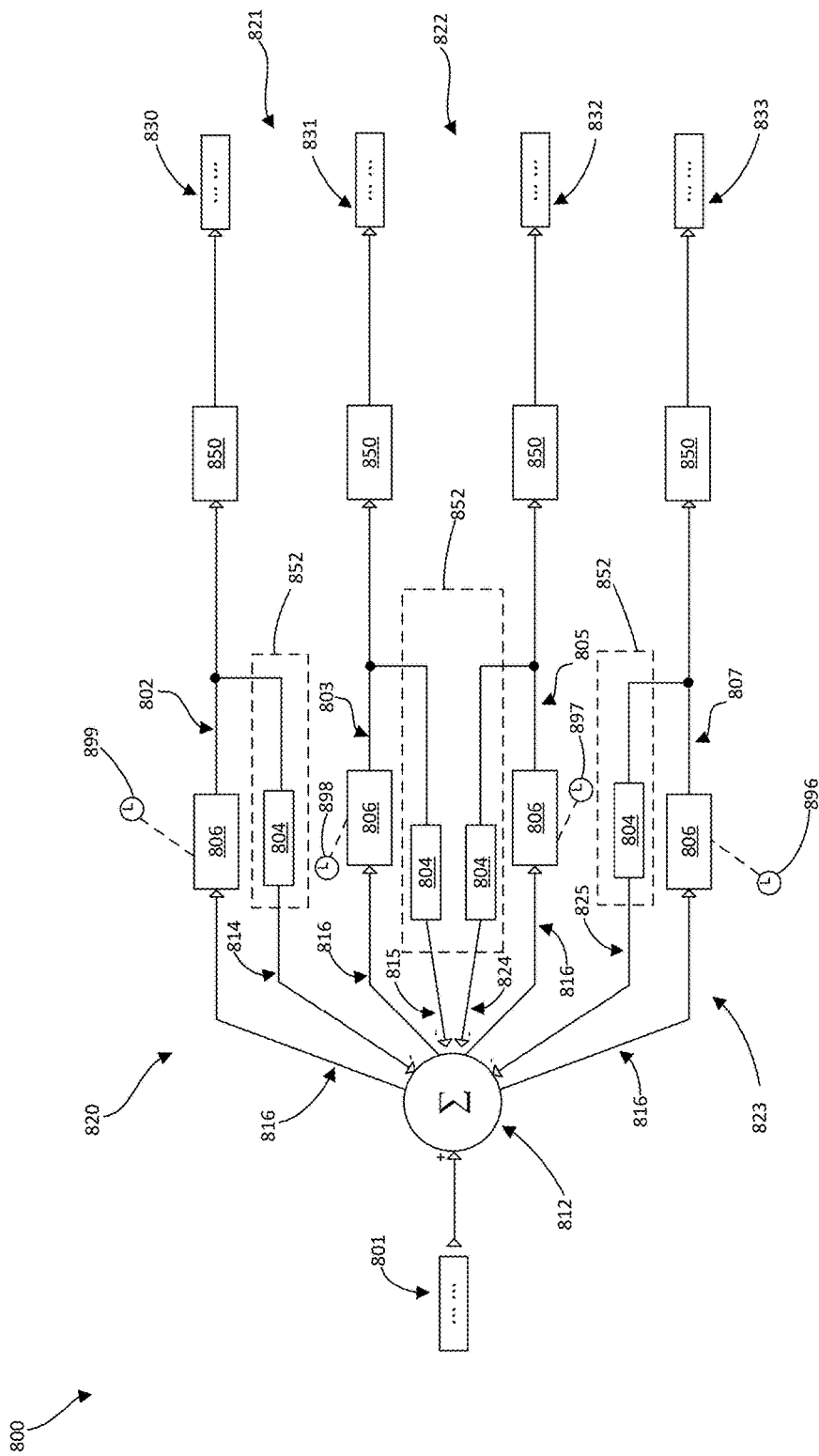
FIG. 8 is a block diagram showing a quarter-rate architecture of a mux-less DFE with two SR latches according to a fifth embodiment.

In another embodiment of the present technology, with reference to FIG. 8, there is depicted a quarter-rate mux-less DFE 800 having four branches 820, 821, 822 and 823. The quarter-rate mux-less DFE 800 comprises at least some components that are configured and operate similarly to at least some of the components of the quarter-rate mux-less DFE 700.

A summing circuit 812, RZ latches 806 and a feedback circuit 852 (including filters 804) are configured and operate similarly to the summing circuit 712, the RZ latches 706 and the feedback circuit 752 (including the filters 704), respectively. For example, the summing circuit 812 may produce an output data signal 816 similarly to how the summing circuit 712 produces the output data signals 716. Also, the RZ latches 806 may produce a first, second, third and fourth RZ data signal 802, 803, 805 and 807, respectively, similarly to how the RZ latches 706 produce the first, second, third and fourth RZ data signal 702, 703, 705 and 707, respectively. Furthermore, the filters 804 may produce respective ISI cancellation signals 814, 815, 824 and 825 similarly to how the filters 704 produce the respective ISI cancellation signals 714, 715, 724 and 725. If the data rate of an full-rate data signal 801 (i.e., input data signal) is the same as the data rate of the full-rate data signal 701, clocks 899, 898, 897 and 896 may be the same as the clocks 799, 798, 797 and 796, respectively.

However, unlike the four branches 720, 721, 722 and 723 of the quarter-rate mux-less DFE 700, each one of the branches 820, 821, 822 and 823 of the quarter-rate mux-less DFE 800 further comprises a respective SR latch 850. The SR latches 850 may be configured and operate similarly to the SR latches 350 depicted in FIG. 3.

As such, when the first RZ data signal 802 of the branch 820 is received by the respective SR latch 850, the SR latch 850 of the branch 820 produces a first NRZ data signal 830 having a first data bit and every fourth data bit after the first data bit of the output data signal 816 (which correspond to the first data bit and every fourth data bit after the first data bit of the full-rate data signal 801). When the second RZ data signal 803 of the branch 821 is received by the respective SR latch 850, the SR latch 850 of the branch 821 produces a second NRZ data signal 831 having a second data bit and every fourth data bit after the second data bit of the output data signal 816 (which correspond to the second data bit and every fourth data bit after the second data bit of the full-rate data signal 801). When the third RZ data signal 805 of the branch 822 is received by the respective SR latch 850, the SR latch 850 of the branch 822 produces a third NRZ data signal 832 having a third data bit and every fourth data bit after the third data bit of the output data signal 816 (which correspond to the third data bit and every fourth data bit after the third data bit of the full-rate data signal 801). When the fourth RZ data signal 807 of the branch 823 is received by the respective SR latch 850, the SR latch 850 of the branch 823 produces a fourth NRZ data signal 833 having a fourth data bit and every fourth data bit after the fourth data bit of the full-rate data signal 816 (which correspond to the fourth data bit and every fourth data bit after the fourth data bit of the full-rate data signal 801).

Figure 9:
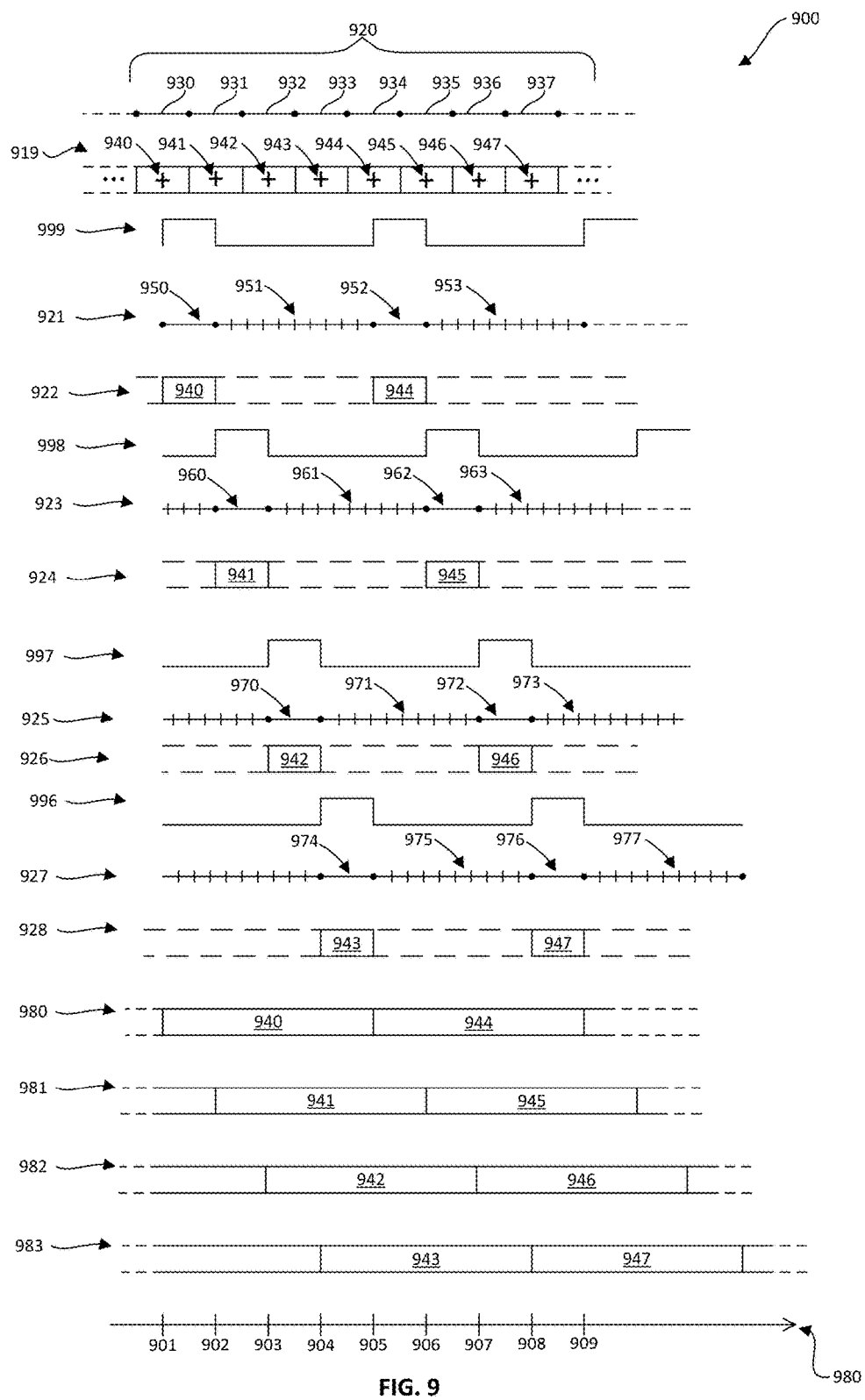
FIG. 9 is a timing diagram for the quarter-rate mux-less DFE of FIG. 8.

With reference to FIG. 9, there is depicted a timing diagram 900 showing how at least some data signals of the quarter-rate mux-less DFE 800 are associated in time. A time axis 980 is depicted at the bottom of the timing diagram 900 and is common to all other elements of the timing diagram 900. The time axis 980 is provided with arbitrarily chosen instants 901, 902, 903, 904, 905, 906, 907, 908 and 909 that are distant from one another by one (1) UI of the full-rate data signal 801.

It should be noted that the timing diagram 900 is depicted for explanation purposes only. In different implementations of the present technology, timing of at least some data signals and/or at least some events described herein below with reference to FIG. 9 may not correspond exactly to what is illustrated by the timing diagram 900.

A timeline 919 represents in time the output data signal 816 of the summing circuit 812. The output data signal 816 is illustratively separated into a plurality 920 of pulse periods associated with respective pulses of the output data signal 816. Since pulses of the output data signal 816 are representative of respective data bits of the output data signal 816, the pulse periods of the plurality 920 are associated with respective data bits of the output data signal 816. The plurality 920 of pulse periods comprises pulse periods 930, 931, 932, 933, 934, 935, 936 and 937 which are immediately sequential in time in that order.

With reference to clock timelines 999, 998, 997 and 996 of the clocks 899, 898, 897 and 896, respectively, the clock 899 is phased away from the clock 898 by 25% of its cycle (90 degrees), the clock 898 is phased away from the clock 897 by 25% of its cycle and the clock 897 is phased away from the clock 896 by 25% of its cycle.

It is to be noted that the clocks 899, 898, 897 and 896 are configured to operate at a 25% duty cycle which means that the respective RZ latches 806 are driven by the respective clocks 899, 898, 897 and 896 to sample the output data signal 816 of the summer circuit 812 during a quarter of each cycle of the respective one of the clocks 899, 898, 897 and 896. Otherwise stated, each of the clock timelines 999, 998, 997 and 996 rises and falls within a quarter of each cycle of the respective clocks 899, 898, 897 and 896.

Operation timeline 921 represents in time evaluation phases 950 and 952 and reset phases 951 and 953 of the RZ latch 806 of the branch 820. The RZ latch 806 of the branch 820 evaluates the output data signal 816 according to the rising edges of the clock timeline 999 and in accordance with the 25% duty cycle of the respective clock 899. In other words, the RZ latch 806 of the branch 820 is configured to evaluate the output data signal 816 for 25% of each cycle of the clock 899 and to reset for the other 75% of each cycle of the clock 899.

For example, the evaluation phases 950 and 952 begin at the instants 901 and 905, respectively, in accordance with the rising edges of the clock timeline 999 and end at the instants 902 and 906, respectively in accordance with the falling edges of the clock timeline 999 (the respective first quarters of the cycles of the clock 899). In the same example, the reset phases 951 and 953 begin at the instants 902 and 906, respectively, in accordance with the falling edges of the clock timeline 999 and end at the instants 905 and 909, respectively, the rising edges of the clock timeline 999 (the respective other three quarters of the cycles of the clock 899).

Operation timeline 923 represents in time evaluation phases 960 and 962 and reset phases 961 and 963 of the RZ latch 806 of the branch 821. The RZ latch 806 of the branch 821 evaluates the output data signal 816 according to the rising edges of the clock timeline 998 and in accordance with the 25% duty cycle of the respective clock 898. In other words, the RZ latch 806 of the branch 821 is configured to evaluate the output data signal 816 for 25% of each cycle of the clock 898 and to reset for the other 75% of each cycle of the clock 898.

Operation timeline 925 represents in time evaluation phases 970 and 972 and reset phases 971 and 973 of the RZ latch 806 of the branch 822. The RZ latch 806 of the branch 822 evaluates the output data signal 816 according to the rising edges of the clock timeline 997 and in accordance with the 25% duty cycle of the respective clock 897. In other words, the RZ latch 806 of the branch 822 is configured to evaluate the output data signal 816 for the first 25% of each cycle of the clock 897 and to reset for the other 75% of each cycle of the clock 897.

Operation timeline 927 represents in time evaluation phases 974 and 976 and reset phases 975 and 977 of the RZ latch 806 of the branch 823. The RZ latch 806 of the branch 823 evaluates the output data signal 816 according to the rising edges of the clock timeline 996 and in accordance with the 25% duty cycle of the respective clock 896. In other words, the RZ latch 806 of the branch 823 is configured to evaluate the output data signal 816 for the first 25% of each cycle of the clock 896 and to reset for the other 75% of each cycle of the clock 896.

It should be noted that phases of the clocks 899, 898, 897 and 896 are adjusted such that values of the respective data bits of the output data signal 816 are sampled at the center of the eye of the output data signal 816 and such that they are phased away from one another in that order by 90 degrees.

A timeline 922 represents in time the first RZ data signal 802 of the RZ latch 806 of the branch 820. At the instant 901, the evaluation phase 950 of the RZ latch 806 of the branch 820 begins and a value 940 of the output data signal 816 is sampled and is transmitted as part of the first RZ data signal 802 until the reset phase 951 begins at the instant 902. As previously alluded to, since the RZ latch 806 of the branch 820 is configured to evaluate in accordance with the 25% duty cycle of the respective clock 899, the RZ latch 806 of the branch 820 evaluates the output data signal 816 for the 25% of each cycle of the clock 899. The value 940 is representative of the first data bit of the output data signal 816 associated with the pulse period 930.

At the instant 902, the reset phase 951 begins and the RZ latch 806 of the branch 820 "resets to zero" the first RZ data signal 802 until the evaluation phase 952 begins at the instant 905. In other words, the first RZ data signal 802 is reset to the reset-reference voltage for the other 75% of each cycle of the clock 899.

At the instant 905, the evaluation phase 952 of the RZ latch 806 of the branch 820 begins and a value 944 of the output data signal 816 is sampled and is transmitted as part of the first RZ data signal 802 until the reset phase 953 begins at the instant 406. The value 944 is representative of the fifth data bit a of the output data signal 816, which is associated with the pulse period 934.

A timeline 924 represents in time the second RZ data signal 803 of the RZ latch 806 of the branch 821 in time. The evaluation phase 960 of the RZ latch 806 of the branch 821 begins and a value 941 of the output data signal 816 is sampled and transmitted as part of the second RZ data signal 803 until the reset phase 961 begins. Since the RZ latch 806 of the branch 821 is configured to evaluate in accordance with the 25% duty cycle of the respective clock 898, the RZ latch 806 of the branch 821 evaluates the output data signal 816 for the first 25% of each cycle of the clock 898. The value 941 is representative of the second data bit of the output data signal 816 associated with the pulse period 931.

The reset phase 961 begins and the RZ latch 806 of the branch 821 "resets to zero" the second RZ data signal 803 until the evaluation phase 962 begins. In other words, the second RZ data signal 803 is reset to the reset-reference voltage for the other 75% of each cycle of the clock 898.

The evaluation phase 962 of the RZ latch 806 of the branch 821 begins and a value 945 of the output data signal 816 is sampled and transmitted as part of the second RZ data signal 802 until the reset phase 963. The value 945 is representative of the sixth data bit of the output data signal 816, which is associated with the pulse period 935.

A timeline 926 represents in time the third RZ data signal 805 of the RZ latch 806 of the branch 822. The evaluation phase 970 of the RZ latch 806 of the branch 822 begins and a value 942 of the output data signal 816 is sampled and transmitted as part of the third RZ data signal 805 until the reset phase 971 begins. Since the RZ latch 806 of the branch 822 is configured to evaluate in accordance with the 25% duty cycle of the respective clock 897, the RZ latch 806 of the branch 822 evaluates the output data signal 816 for the first 25% of each cycle of the clock 897. The value 942 is representative of the third data bit of the output data signal 816 associated with the pulse period 932.

The reset phase 971 begins and the RZ latch 806 of the branch 822 "resets to zero" the third RZ data signal 805 until the evaluation phase 972 begins. In other words, the third RZ data signal 805 is reset to the reset-reference voltage for the other 75% of each cycle of the clock 897.

The evaluation phase 972 of the RZ latch 806 of the branch 822 begins and a value 946 of the output data signal 816 is sampled and transmitted as part of the third RZ data signal 805 until the reset phase 973. The value 946 is representative of a seventh data bit of the output data signal 816, which is associated with the pulse period 936.

A timeline 928 represents in time the fourth RZ data signal 807 of the RZ latch 806 of the branch 823. The evaluation phase 974 of the RZ latch 806 of the branch 823 begins and a value 943 of the output data signal 816 is sampled and is transmitted as part of the fourth RZ data signal 807 until the reset phase 975 begins. Since the RZ latch 806 of the branch 823 is configured to evaluate in accordance with the 25% duty cycle of the respective clock 896, the RZ latch 806 of the branch 823 evaluates the output data signal 816 for the first 25% of each cycle of the clock 896. The value 943 is representative of the fourth data bit of the output data signal 816 associated with the pulse period 933.

The reset phase 975 begins and the RZ latch 806 of the branch 823 "resets to zero" the fourth RZ data signal 807 until the evaluation phase 976 begins. In other words, the fourth RZ data signal 807 is reset to the reset-reference voltage for the other 75% of each cycle of the clock 896.

The evaluation phase 976 of the RZ latch 806 of the branch 823 begins and a value 947 of the output data signal 816 is sampled and transmitted as part of the fourth RZ data signal 807 until the reset phase 977. The value 947 is representative of the eighth data bit of the output data signal 816, which is associated with the pulse period 937.

A timeline 980 represents in time the first NRZ data signal 830 of the SR latch 850 of the branch 820. At the instant 901, the value 940 of the first RZ data signal 802 is received by the respective SR latch 850 which transmits the value 940 as part of the first NRZ data signal 830. At the instant 902, even though the value of the reset-reference voltage of the first RZ data signal 802 is received by the respective SR latch 850, the respective SR latch 850 continues to transmit the value 940 as part of the first NRZ data signal 830. The respective SR latch 850 transmits the value 940 as part of the first NRZ data signal 830 until the value 944 of the first RZ data signal 802 is received at the instant 905 at which the respective SR latch 850 transmits the value 944 as part of the first NRZ data signal 830.

A timeline 981 represents in time the second NRZ data signal 831 of the SR latch 850 of the branch 821. At the instant 902, the value 941 of the second RZ data signal 803 is received by the respective SR latch 850 which transmits the value 941 as part of the second NRZ data signal 831. At the instant 903, even though the value of the reset-reference voltage of the second RZ data signal 803 is received by the respective SR latch 850, the respective SR latch 850 continues to transmit the value 941 as part of the second NRZ data signal 831. The respective SR latch 850 transmits the value 941 as part of the second NRZ data signal 831 until the value 945 of the second RZ data signal 803 is received at the instant 906 at which the respective SR latch 850 transmits the value 945 as part of the second NRZ data signal 831.

A timeline 982 represents in time the third NRZ data signal 832 of the SR latch 850 of the branch 822. At the instant 903, the value 942 of the third RZ data signal 805 is received by the respective SR latch 850 which transmits the value 942 as part of the third NRZ data signal 832. At the instant 904, even though the value of the reset-reference voltage of the third RZ data signal 805 is received by the respective SR latch 850, the respective SR latch 850 continues to transmit the value 942 as part of the third NRZ data signal 832. The respective SR latch 850 transmits the value 942 as part of the third NRZ data signal 832 until the value 946 of the third RZ data signal 805 is received at the instant 907 at which the respective SR latch 850 transmits the value 946 as part of the third NRZ data signal 832.

A timeline 983 represents in time the fourth NRZ data signal 833 of the SR latch 850 of the branch 823. At the instant 904, the value 943 of the fourth RZ data signal 807 is received by the respective SR latch 850 which transmits the value 943 as part of the fourth NRZ data signal 833. At the instant 905, even though the value of the reset-reference voltage of the fourth RZ data signal 807 is received by the respective SR latch 850, the respective SR latch 850 continues to transmit the value 943 as part of the fourth NRZ data signal 833. The respective SR latch 850 transmits the value 943 as part of the fourth NRZ data signal 833 until the value 947 of the fourth RZ data signal 807 is received at the instant 908 at which the respective SR latch 850 transmits the value 947 as part of the fourth NRZ data signal 833.

It is contemplated that at least some data signals of the quarter-rate mux-less DFE 700 may be associated in time similarly to how at least some data signals of the quarter-rate mux-less DFE 800 are associated in time. Therefore, a timing diagram (not depicted) for the half-rate mux-less DFE 700 may be similar to the timing diagram 900, depicted in FIG. 9, for the quarter-rate mux-less DFE 800 but without the timelines 980, 981, 982 and 983.

Figure 10:
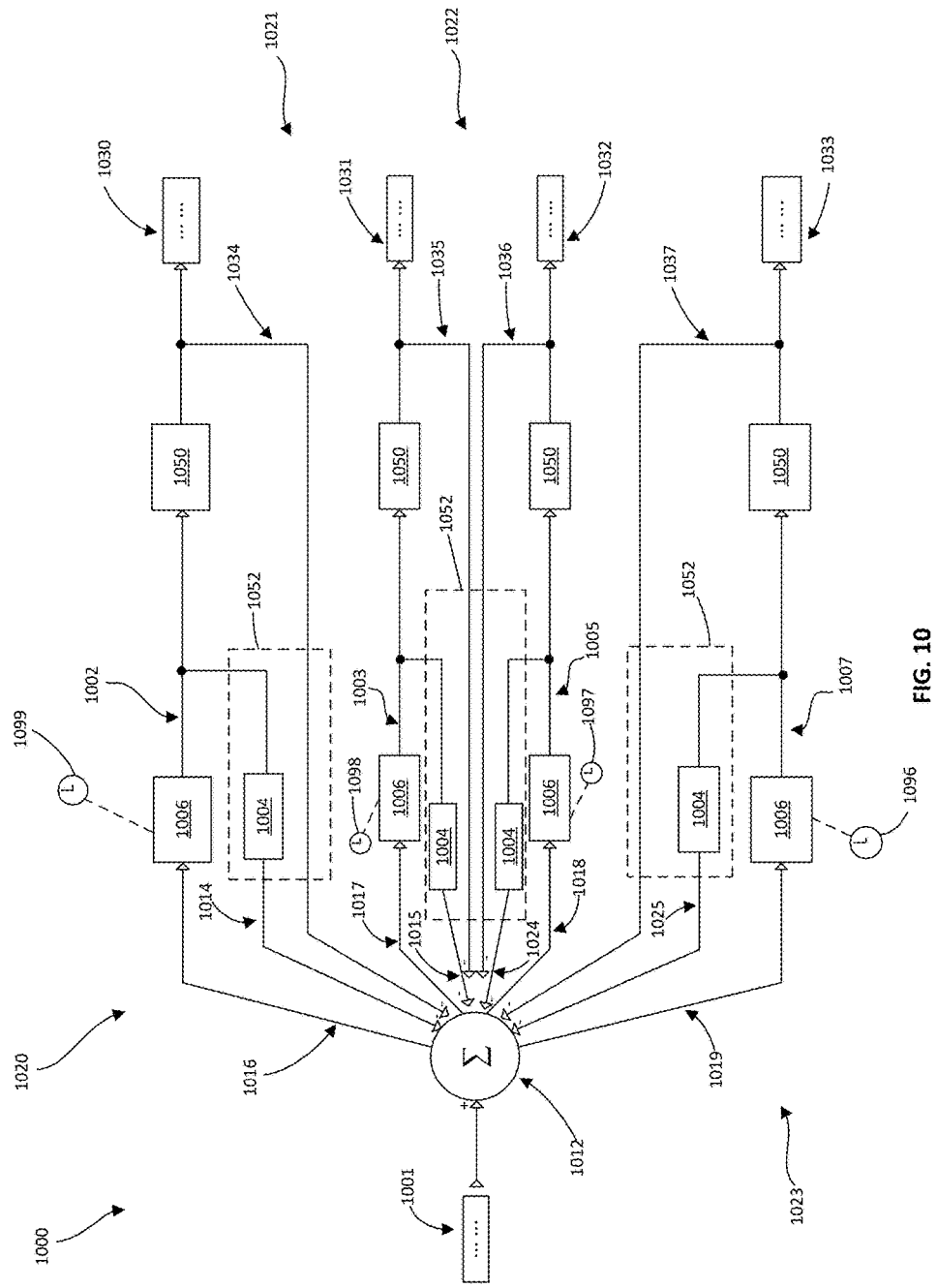
FIG. 10 is a block diagram showing a quarter-rate architecture of a mux-less DFE with four feedback loops.

In yet another embodiment of the present technology, with reference to FIG. 10, there is depicted a quarter-rate mux-less DFE 1000 having four branches 1020, 1021, 1022 and 1023. The quarter-rate mux-less DFE 1000 comprises at least some components that are configured and operate similarly to at least some of the components of the quarter-rate mux-less DFE 800.

For example, RZ latches 1006, RS latches 1050, filters 1004 are configured and operate similarly to the RZ latches 806, the RS latches 850, the filters 804, respectively. If the data rate of an full-rate data signal 1001 (i.e., input data signal) is the same as the data rate of the full-rate data signal 801, clocks 1099, 1098, 1097 and 1096 may be the same as the clocks 899, 898, 897 and 896, respectively.

However, unlike the quarter-rate mux-less DFE 800 having the feedback circuit 852 and the summing circuit 812, the quarter-rate mux-less DFE 1000 has a feedback circuit 1052 and a summing circuit 1012. How the quarter-rate mux-less DFE 1000 is configured to produce a first, second, third and fourth NRZ data signals 1030, 1031, 1032 and 1033 as well as how the feedback circuit 1052 and the summing circuit 1012 are configured and operate will be described in more details herein below.

In addition to the filters 1004 providing respective ISI cancellation signals 1014, 1015, 1024 and 1025 to the summing circuit 1012, the feedback circuit 1052 also comprises a first, second, third and fourth feedback loops 1034, 1035, 1036 and 1037. The first feedback loop 1034 provides a first feedback tap signal (i.e., the first NRZ data signal 1030) from the SR latch 1050 of the branch 1020 to the summing circuit 1012. The second feedback loop 1035 provides a second feedback tap signal (i.e., the second NRZ data signal 1031) from the SR latch 1050 of the branch 1021 to the summing circuit 1012. The third feedback loop 1036 provides a third feedback tap signal (i.e., the third NRZ data signal 1032) from the SR latch 1050 of the branch 1022 to the summing circuit 1012. The fourth feedback loop 1037 provides a fourth feedback tap signal (i.e., the fourth NRZ data signal 1033) from the SR latch 1050 of the branch 1023 to the summing circuit 1012.

The summing circuit 1012 is configured to produce a distinct output signal for each one of the branches 1020, 1021, 1022 and 1023. For example, the summing circuit 512 is configured to produce output data signals 1016, 1017, 1018 and 1019 for the branches 1020, 1021, 1022 and 1023, respectively.

Based on (i) the ISI cancellation signal 1014, (ii) the ISI cancellation signal 1015, (iii) the ISI cancellation signal 1024, (iv) the ISI cancellation signal 1025, (v) the first feedback tap signal of the first feedback loop 1034, (vi) the second feedback tap signal of the second feedback loop 1035, (vii) the third feedback tap signal of the third feedback loop 1036, (viii) the fourth feedback tap signal of the first feedback loop 1037 and (ix) the full-rate data signal 1001, the summing circuit 1012 is configured to generate the respective output data signals 1016, 1017, 1018 and 1019 for the branches 1020, 1021, 1022 and 1023. However, it should be noted that the summing circuit 1012 is configured to combine distinct combinations of its input signals for producing distinct output signals.

The summing circuit 1012 is configured to combine the fourth feedback tap signal of the fourth feedback loop 1037 as well as the ISI cancellation signals 1014, 1015, 1024 and 1025 with the full-rate data signal 1001 for producing the output data signal 1016. For example, the summing circuit 1012 may be configured to subtract the fourth feedback tap signal of the fourth feedback loop 1037 as well as the ISI cancellation signals 1014, 1015, 1024 and 1025 from the full-rate data signal 1001 for producing the output data signal 1016.

It should be noted that the fourth feedback tap signal (i.e., the fourth NRZ data signal 1033) of the fourth feedback loop 1037 is used to compensate for a first post-cursor of the channel pulse response while the ISI cancellation signals 1014, 1015, 1024 and 1025 are used to compensate for other post-cursors in the channel pulse response.

The summing circuit 1012 is configured to combine the first feedback tap signal of the first feedback loop 1034 as well as the ISI cancellation signals 1014, 1015, 1024 and 1025 with the full-rate data signal 1001 for producing the output data signal 1017.

It should be noted that the first feedback tap signal (i.e., the first NRZ data signal 1030) of the first feedback loop 1034 is used to compensate for a first post-cursor of the channel pulse response while the ISI cancellation signals 1014, 1015, 1024 and 1025 are used to compensate for other post-cursors in the channel pulse response.

The summing circuit 1012 is configured to combine the second feedback tap signal of the second feedback loop 1035 as well as the ISI cancellation signals 1014, 1015, 1024 and 1025 with the full-rate data signal 1001 for producing the output data signal 1018.

It should be noted that the second feedback tap signal (i.e., the second NRZ data signal 1031) of the second feedback loop 1035 is used to compensate for a first post-cursor of the channel pulse response while the ISI cancellation signals 1014, 1015, 1024 and 1025 are used to compensate for other post-cursors in the channel pulse response.

The summing circuit 1012 is configured to combine the third feedback tap signal of the third feedback loop 1036 as well as the ISI cancellation signals 1014, 1015, 1024 and 1025 with the full-rate data signal 1001 for producing the output data signal 1019.

It should be noted that the third feedback tap signal (i.e., the third NRZ data signal 1032) of the third feedback loop 1036 is used to compensate for a first post-cursor of the channel pulse response while the ISI cancellation signals 1014, 1015, 1024 and 1025 are used to compensate for other post-cursors in the channel pulse response.

It should also be noted that the RZ latches 1006 of the respective branches 1020, 1021, 1022 and 1023 are configured to produce respective first, second, third and fourth RZ data signal 1002, 1003, 1005 and 1007 based on the respective output signals 1016, 1017, 1018 and 1019 similarly to how the RZ latches 806 of the respective branches 820, 821, 822 and 823, depicted in FIG. 8, are configured to produce the respective first, second, third and fourth RZ data signals 802, 803, 805 and 807 based on the output signal 816.

It should also be noted that the RS latches 1050 are configured to produce the first, second, third and fourth NRZ data signals 1030, 1031, 1032 and 1033, respectively, based on the first, second, third and fourth RZ data signals 1002, 1003, 1005 and 1007, respectively, similarly to how the RS latches 850 are configured to produce the first, second, third and fourth NRZ data signals 830, 831, 832 and 833, respectively, based on the first, second, third and fourth RZ data signals 802, 803, 805 and 807, respectively.

It is contemplated that at least some data signals of the quarter-rate mux-less DFE 1000 may be associated in time similarly to how at least some data signals of the quarter-rate mux-less DFE 800 are associated in time. Therefore, a timing diagram (not shown) for the quarter-rate mux-less DFE 1000 may be similar to the timing diagram 900, depicted in FIG. 9, for the quarter-rate mux-less DFE 800.

Figure 11:
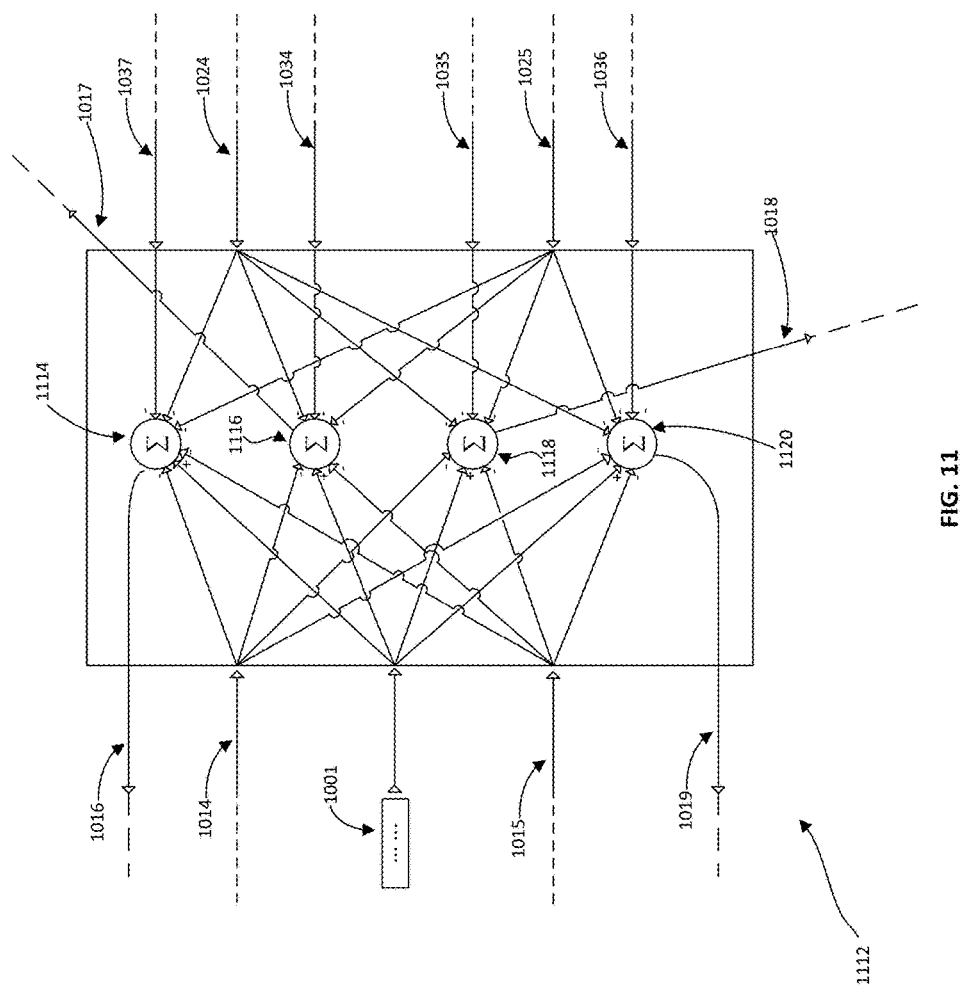
FIG. 11 is an alternative embodiment of a summing circuit of the mux-less DFE of FIG. 10.

In a non-limiting example, with reference to FIG. 11, the quarter-rate mux-less DFE 1000 may comprise a summing circuit 1112, instead of the summing circuit 1012. The summing circuit 1112 comprises four summing sub-circuits 1114, 1116, 1118 and 1120 which are configured to receive distinct combinations of input signals of the summing circuit 1112.

For example, the summing sub-circuit 1114 is configured to receive the full-rate data signal 1001, the fourth feedback tap signal (i.e., the fourth NRZ data signal 1033) of the second feedback loop 1037 as well as the ISI cancellation signals 1014, 1015, 1024 and 1025. As such, the summing sub-circuit 1114 is configured to combine the fourth feedback tap signal of the second feedback loop 1037 as well as the ISI cancellation signals 1014, 1015, 1024 and 1025 with the full-rate data signal 1001 for producing the output data signal 1016.

In the same example, the summing sub-circuit 1116 is configured to receive the full-rate data signal 1001, the first feedback tap signal (i.e., the first NRZ data signal 1030) of the first feedback loop 1034 as well as the ISI cancellation signals 1014, 1015, 1024 and 1025. As such, the summing sub-circuit 1116 is configured to combine the first feedback tap signal of the first feedback loop 1034 as well as the ISI cancellation signals 1014, 1015, 1024 and 1025 with the full-rate data signal 1001 for producing the output data signal 1017.

In the same example, the summing sub-circuit 1118 is configured to receive the full-rate data signal 1001, the second feedback tap signal (i.e., the second NRZ data signal 1031) of the second feedback loop 1035 as well as the ISI cancellation signals 1014, 1015, 1024 and 1025. As such, the summing sub-circuit 1118 is configured to combine the second feedback tap signal of the second feedback loop 1035 as well as the ISI cancellation signals 1014, 1015, 1024 and 1025 with the full-rate data signal 1001 for producing the output data signal 1018.

In the same example, the summing sub-circuit 1120 is configured to receive the full-rate data signal 1001, the third feedback tap signal (i.e., the third NRZ data signal 1032) of the third feedback loop 1036 as well as the ISI cancellation signals 1014, 1015, 1024 and 1025. As such, the summing sub-circuit 1120 is configured to combine the third feedback tap signal of the third feedback loop 1036 as well as the ISI cancellation signals 1014, 1015, 1024 and 1025 with the full-rate data signal 1001 for producing the output data signal 1019.

It is contemplated that the summing circuit 1112 may comprise, in addition to the summing sub-circuits 1114, 1116, 1118 and 1120, an auxiliary summing sub-circuit (not shown) for combining the ISI cancellation signals 1014, 1015, 1024 and 1025 into a common ISI cancellation signal (not shown) which may then be provided to each one of the summing sub-circuits 1114, 1116, 1118 and 1120.

Figure 12:
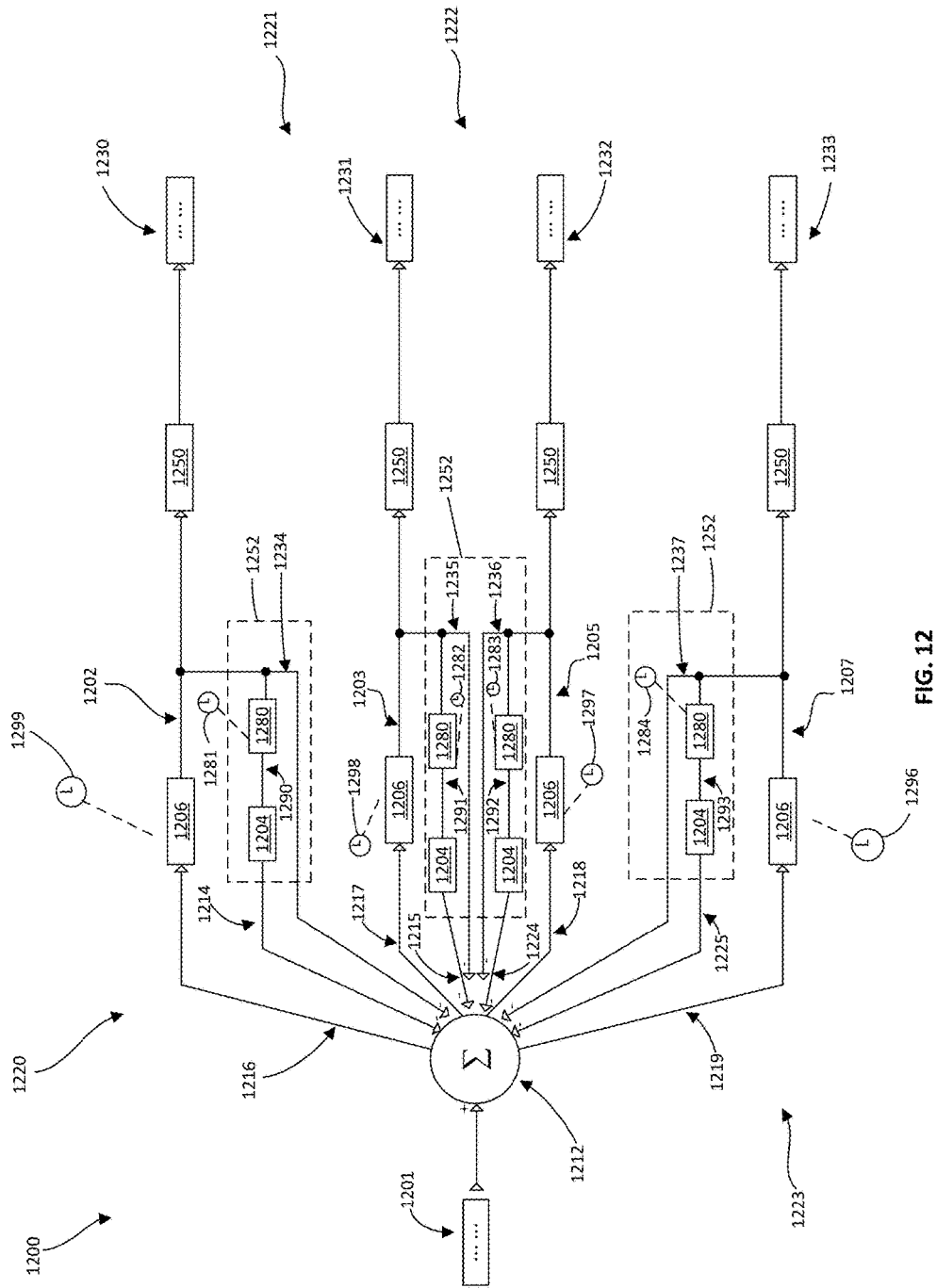
FIG. 12 is a block diagram showing a quarter-rate architecture of a mux-less DFE with four other feedback loops and four AND-gates.

In yet another embodiment of the present technology, with reference to FIG. 12, there is depicted a quarter-rate mux-less DFE 1200 having four branches 1220, 1221, 1222 and 1223. Each of the branches 1120, 1221, 1222 and 1223 comprises a respective RZ latch 1206 and a respective RS latch 1250. However, it is contemplated that the RS latches 1250 of the quarter-rate mux-less DFE 1200 may be omitted. The RZ latches 1206 of the branches 1220, 1221, 1222 and 1223, respectively, receive output data signals 1216, 1217, 1218 and 1219, respectively.

The RZ latches 1206 of the branches 1220, 1221, 1222 and 1223, respectively, are driven by clocks 1299, 1298, 1297 and 1296, respectively. The clocks 1299, 1298, 1297 and 1296 are of a quarter of the rate of the clock driving an full-rate data signal 1201 (i.e., input data signal) similarly to the clocks 899, 898, 897 and 896 of the quarter-rate mux-less DFE 800 depicted in FIG. 8 which are also of quarter the rate of the clock driving the full-rate data signal 801.

However, unlike the clocks 899, 898, 897 and 896, the clocks 1299, 1298, 1297 and 1296 are configured to operate at a 50% duty cycle (i.e., a half duty cycle), instead of being configured to operate at a 25% duty cycle. This means that the respective RZ latches 1206 are driven by the respective clocks 1299, 1298, 1297 and 1296 to sample the respective output data signals 1216, 1217, 1218 and 1219 of a summer circuit 1212 during half of each cycle of the respective one of the clocks 1299, 1298, 1297 and 1296.

The clock 1298 is phased away from the clock 1299 by 25% of its cycle (90 degrees). The clock 1297 is phased away from the clock 1298 by 25% of its cycle. The clock 1296 is phased away from the clock 1297 by 25% of its cycle. It is contemplated that, instead of driving the RZ latches 1206 of the branches 1220 and 1222 by the clocks 1299 and 1297, respectively, the RZ latches 1206 of the branches 1220 and 1222 may be driven by either one of the clocks 1299 and 1297 respectively on opposite phases thereof. Similarly, instead of driving the RZ latches 1206 of the branches 1221 and 1223 by the clocks 1298 and 1296, respectively, the RZ latches 1206 of the branches 1221 and 1223 may be driven by either one of the clocks 1298 and 1296 respectively on opposite phases thereof.

The RZ latches 1206 of the branches 1220, 1221, 1222 and 1223, respectively, produce a first, second, third and fourth RZ output data signals 1202, 1203, 1205 and 1207, respectively. Since the RZ latches 1206 are driven by the respective clocks 1299, 1298, 1297 and 1296 in accordance with the 50% duty cycles, the first, second, third and fourth RZ output data signals 1202, 1203, 1205 and 1207, respectively, transmit values of the output data signals 1216, 1217, 1218 and 1219, respectively, for a half of each cycle of the respective clocks 1299, 1298, 1297 and 1296 and are reset to the reset-reference voltage for the other half of each cycle of the respective clocks 1299, 1298, 1297 and 1296. The first, second, third and fourth RZ output data signals 1202, 1203, 1205 and 1207 are also received by the respective SR latches 1250 which produce first, second, third and fourth NRZ data signals 1230, 1231, 1232 and 1232, respectively.

The quarter-rate mux-less DFE 1200 also comprises a feedback circuit 1252. The feedback circuit 1252 comprises first, second, third and fourth feedback loops 1234, 1235, 1236 and 1237 providing first, second, third and fourth feedback tap signals, from the branches 1220, 1221, 1222 and 1223, respectively, to the summing circuit 1212. The first, second, third and fourth feedback signals are the first, second, third and fourth RZ data signals 1202, 1203, 1205 and 1207, respectively, which transmit values of the respective output data signals 1216, 1217, 1218 and 1219 which are reset to the reset-reference voltage for half of the time due to the 50% duty cycles of the respective clocks 1299, 1298, 1297 and 1296 driving the respective RZ latches 1204.

The feedback circuit 1252 also comprises four filters 1208 and four AND-gates 1280. Each one of the AND-gates 1280 is configured to receive a respective one of the first, second, third and fourth RZ data signals 1202, 1203, 1205 and 1207. Each one of the AND-gates 1280 is driven by a respective one of clocks 1281, 1282, 1283 and 1284. The respective clocks 1281, 1282, 1283 and 1284 are such that when the AND-gates 1280 receive the respective first, second, third and fourth RZ data signals 1202, 1203, 1205 and 1207, the AND-gates 1280 are configured to output respective modified RZ data signals 1290, 1291, 1292 and 1293 which are reset to the reset-reference voltage for 75% of the time.

The filters 1204 are configured to receive respective modified RZ data signals 1290, 1291, 1292 and 1293 similarly to how the filter 1104 are configured to receive the RZ data signals 1102, 1103, 1105 and 1107. As a result, the filters 1204 produce respective ISI cancellation signals 1214, 1215, 1224 and 1225. The ISI cancellation signals are received by the summing circuit 1212.

The summing circuit 1212 combines the ISI cancellation signals 1214, 1215, 1224 and 1225 as well as the fourth feedback tap signal of the fourth feedback loop 1237 with the full-rate data signal 1201 for producing the output data signal 1216. The summing circuit 1212 combines the ISI cancellation signals 1214, 1215, 1224 and 1225 as well as the first feedback tap signal of the first feedback loop 1234 with the full-rate data signal 1201 for producing the output data signal 1217. The summing circuit 1212 combines the ISI cancellation signals 1214, 1215, 1224 and 1225 as well as the second feedback tap signal of the second feedback loop 1235 with the full-rate data signal 1201 for producing the output data signal 1218. The summing circuit 1212 combines the ISI cancellation signals 1214, 1215, 1224 and 1225 as well as the third feedback tap signal of the third feedback loop 1236 with the full-rate data signal 1201 for producing the output data signal 1219.

Figure 13:
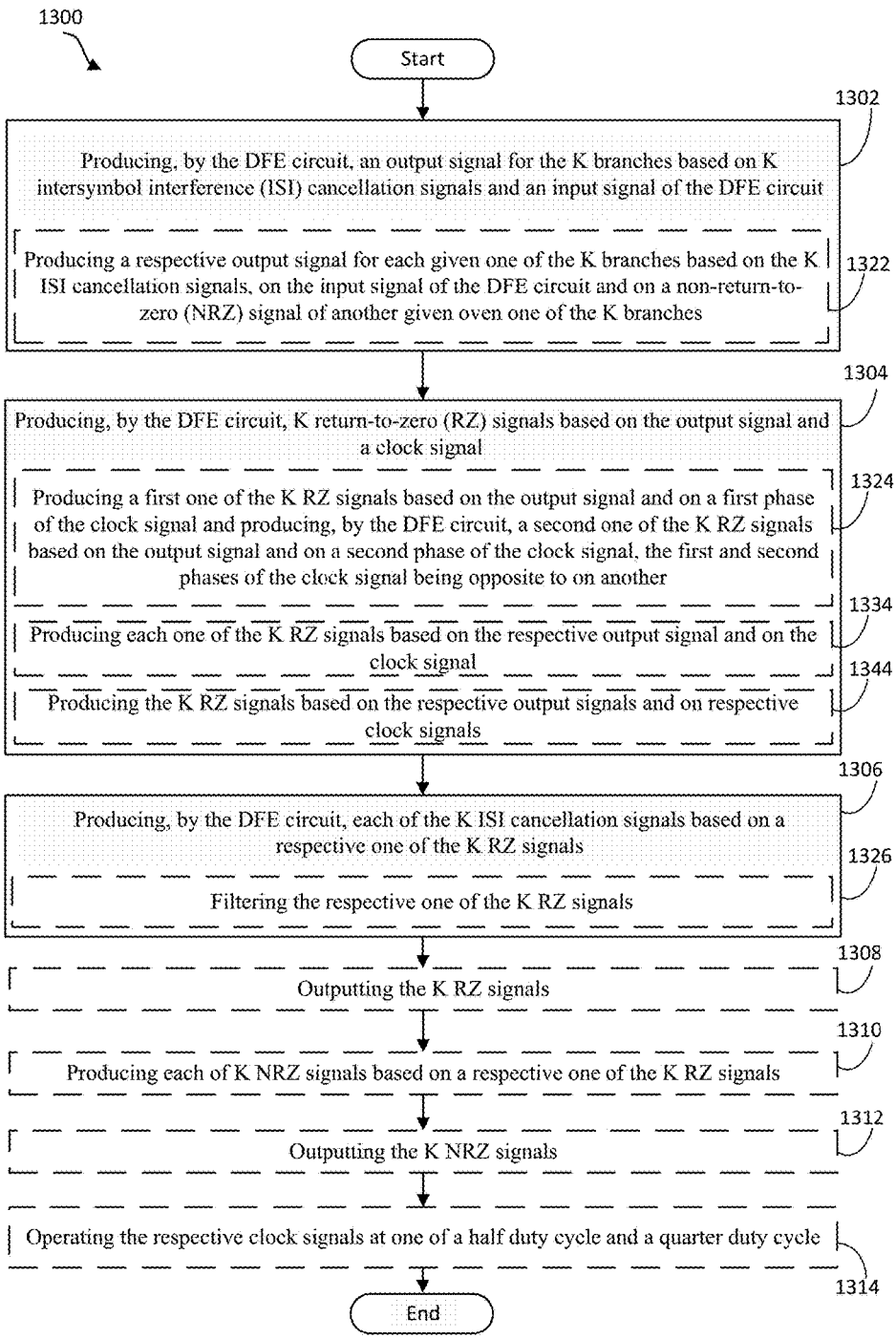
FIG. 13 is a scheme-block representation of a method of decision feedback equalization executable by a mux-less DFE.

In another embodiment of the present technology, with reference to FIG. 13, there is depicted a sequence diagram of a method 1300 of decision feedback equalization. The method 1300 comprises a plurality of operations that may be executed in variable order, some of the operations possibly being executed concurrently, some of the operations being optional. The method 1300 is executable by a given 1/K-rate mux-less DFE comprising K branches such as by at least one of the mux-less DFEs 200, 300, 500, 700, 800, 1000 and 1200 depicted in FIGS. 2, 3, 5, 7, 8, 10 and 12, respectively.

The method 1300 begins at operation 1302 with the given 1/K-rate mux-less DFE producing a given output data signal for the K branches thereof based on K given ISI cancellation signals and a given full-rate data signal of the given 1/K-rate mux-less DFE.

For example, in operation 1302, the half-rate mux-less DFE 200 depicted in FIG. 2 produces the output signal 216 for the two branches 220 and 221 thereof based on the ISI cancellation signals 214 and 215 and the full-rate data signal 201. The ISI cancellation signals 214 and 215 as well as the full-rate data signal 201 may be received by the summing circuit 212. The summing circuit 212 may combine the ISI cancellation signals 214 and 215 as well as the full-rate data signal 201 into the output data signal 216.

As previously mentioned, a given summing circuit may combine voltages by adding at least some input voltages and/or by subtracting at least some input voltages depending inter alia on voltage signs (i.e., negative or positive) and on various implementations of the present technology.

In another example of operation 1302, the half-rate mux-less DFE 300 depicted in FIG. 3 produces the output signal 316 for the two branches 320 and 321 thereof based on the ISI cancellation signals 314 and 315 and the full-rate data signal 301 similarly to how the half-rate mux-less DFE 200 produces the output signal 216 for the two branches 220 and 221 thereof based on the ISI cancellation signals 214 and 215 and the full-rate data signal 201.

In a further example of operation 1302, the quarter-rate mux-less DFE 700 depicted in FIG. 7 produces the output signal 716 for the four branches 720, 721, 722 and 723 thereof based on the ISI cancellation signals 714, 715, 724 and 725 and the full-rate data signal 701. The ISI cancellation signals 714, 715, 724 and 725 as well as the full-rate data signal 701 may be received by the summing circuit 712. The summing circuit 712 may combine the ISI cancellation signals 714, 715, 724 and 725 as well as the full-rate data signal 701 into the output data signal 716.

In yet another example of operation 1302, the quarter-rate mux-less DFE 800 depicted in FIG. 8 produces the output signal 816 for the four branches 820, 821, 822 and 823 thereof based on the ISI cancellation signals 814, 815, 824 and 825 and the full-rate data signal 801 similarly to how the quarter-rate mux-less DFE 700 depicted produces the output signal 716 for the four branches 720, 721, 722 and 723 thereof based on the ISI cancellation signals 714, 715, 724 and 725 and the full-rate data signal 701.

In some embodiments of the present technology, method 1300 may comprise a sub-operation 1322 for producing given respective output data signals for K given branches of a given 1/K-rate mux-less DFE based on K given ISI cancellation signals, a given full-rate data signal and K given NRZ data signals.

For example, during sub-operation 1322, the half-rate mux-less DFE 500 depicted in FIG. 5 produces the output data signal 516 for the branch 520 thereof and the output data signal 517 for the branch 521 thereof. The half-rate mux-less DFE 500 produces the output data signal 516 based on the ISI cancellation signals 514 and 514, the full-rate data signal 501 and the odd NRZ data signal 531 of the branch 521. The half-rate DFE 500 produces the output data signal 517 based on the ISI cancellation signals 514 and 514, the full-rate data signal 501 and the even NRZ data signal 530 of the branch 520.

It is contemplated that the half-rate mux-less DFE 500 may combine the ISI cancellation signals 514 and 514, the full-rate data signal 501 and the odd NRZ data signal 531 of the branch 521 into the output data signal 516 by employing one of the summing circuits 512 and 612 (see FIG. 6). It is also contemplated that the half-rate mux-less DFE 500 may combine the ISI cancellation signals 514 and 514, the full-rate data signal 501 and the even NRZ data signal 530 into the output data signal 517 by employing one of the summing circuits 512 and 612.

In another example of sub-operation 1322, the quarter-rate mux-less DFE 1000 depicted in FIG. 10 produces the output data signal 1016 for the branch 1020 thereof, the output data signal 1017 for the branch 1021 thereof, the output data signal 1018 for the branch 1022 thereof and the output data signal 1019 for the branch 1023 thereof. The quarter-rate mux-less DFE 1000 produces the output data signal 1016 based on the ISI cancellation signals 1014, 1015, 1024 and 1025, the full-rate data signal 1001 and the fourth NRZ data signal 1033 of the branch 1023. The quarter-rate mux-less DFE 1000 produces the output data signal 1017 based on the ISI cancellation signals 1014, 1015, 1024 and 1025, the full-rate data signal 1001 and the first NRZ data signal 1030 of the branch 1020. The quarter-rate mux-less DFE 1000 produces the output data signal 1018 based on the ISI cancellation signals 1014, 1015, 1024 and 1025, the full-rate data signal 1001 and the second NRZ data signal 1031 of the branch 1021. The quarter-rate mux-less DFE 1000 produces the output data signal 1019 based on the ISI cancellation signals 1014, 1015, 1024 and 1025, the full-rate data signal 1001 and the third NRZ data signal 1032 of the branch 1022.

It is contemplated that the quarter-rate mux-less DFE 1000 may combine the ISI cancellation signals 1014, 1015, 1024 and 1025, the full-rate data signal 1001 and the fourth NRZ data signal 1033 into the output data signal 1016 by employing one of the summing circuits 1012 and 1112 (see FIGS. 10 and 11). It is also contemplated that the quarter-rate DFE 1000 may combine the ISI cancellation signals 1014, 1015, 1024 and 1025, the full-rate data signal 1001 and the first NRZ data signal 1030 into the output data signal 1017 by employing one of the summing circuits 1012 and 1112. It is also contemplated that the quarter-rate mux-less DFE 1000 may combine the ISI cancellation signals 1014, 1015, 1024 and 1025, the full-rate data signal 1001 and the second NRZ data signal 1031 into the output data signal 1018 by employing one of the summing circuits 1012 and 1112. It is also contemplated that the quarter-rate mux-less DFE 1000 may combine the ISI cancellation signals 1014, 1015, 1024 and 1025, the full-rate data signal 1001 and the third NRZ data signal 1032 into the output data signal 1019 by employing one of the summing circuits 1012 and 1112.

It is also contemplated that the method 1300 may comprise producing the output data signals 1216, 1217, 1218 and 1219 for the branches 1220, 1221, 1222 and 1223 of the quarter-rate mux-less DFE 1200 depicted in FIG. 12 based on the ISI cancellation signals 1214, 1215, 1224 and 1225, the full-rate data signal 1201 and the RZ data signals 1202, 1203, 1205 and 1207. It should be noted however that the RZ data signals 1202, 1203, 1205 and 1207 are reset to the reset-reference voltage only for the half of each cycle of the respective clocks 1299, 1298, 1297 and 1296, unlike the RZ data signals 1002, 1003, 1005 and 1007 which are reset to the reset-reference voltage for three quarters of each cycle of the respective clocks 1099, 1098, 1097 and 1096.

The quarter-rate mux-less DFE 1200 produces the output data signal 1216 for the branch 1220 thereof, the output data signal 1217 for the branch 1221 thereof, the output data signal 1218 for the branch 1222 thereof and the output data signal 1219 for the branch 1223 thereof. The quarter-rate DFE 1200 produces the output data signal 1216 based on the ISI cancellation signals 1214, 1215, 1224 and 1225, the full-rate data signal 1201 and the fourth RZ data signal 1233 of the branch 1223. The quarter-rate DFE 1200 produces the output data signal 1217 based on the ISI cancellation signals 1214, 1215, 1224 and 1225, the full-rate data signal 1201 and the first RZ data signal 1230 of the branch 1220. The quarter-rate mux-less DFE 1200 produces the output data signal 1218 based on the ISI cancellation signals 1214, 1215, 1224 and 1225, the full-rate data signal 1201 and the second RZ data signal 1231 of the branch 1221. The quarter-rate mux-less DFE 1200 produces the output data signal 1219 based on the ISI cancellation signals 1214, 1215, 1224 and 1225, the full-rate data signal 1201 and the third NRZ data signal 1232 of the branch 1222.

The method 1300 continues to operation 1304 with a given 1/K-rate mux-less DFE producing K given RZ data signals based on a given output data signal and a given clock.

For example, in the operation 1304, the half-rate mux-less DFE 200 depicted in FIG. 2 produces the even and odd RZ data signals 202 and 203 based on the output data signal 216 and the clock 299. The RZ latch 206 of the branch 220 may receive the output data signal 216 and, in accordance with the clock 299, may produce the even RZ data signal 202. The RZ latch 206 of the branch 221 may receive the output data signal 216 and, in accordance with the clock 299, may produce the odd RZ data signal 203.

As previously mentioned, each RZ latch 206 is driven by the clock 299, being of half the rate of the clock driving the full-rate data signal 201, and is used to sample the output data signal 216 of the summing circuit 212. The RZ latches 206 are driven on opposite phases of the clock 299, so that the RZ latch 206 of the branch 220 produces even data bits for the even RZ data signal 202 while the RZ latch 206 of the branch 221 produces odd data bits for the odd RZ data signal 203. It is contemplated, however, that the RZ latches 206 may be driven by respective clocks having a same cycle period but which are phased away from one another by 180 degrees.

In another example of the operation 1304, the half-rate mux-less DFE 300 depicted in FIG. 3 produces the even and odd RZ data signals 302 and 303 based on the output data signal 316 and the clock 399 similarly to how the half-rate mux-less DFE 200 produces the even and odd RZ data signals 202 and 203 based on the output data signal 216 and the clock 299.

In a further example of operation 1304, the quarter-rate mux-less DFE 700 depicted in FIG. 7 produces the first, second, third and fourth RZ data signals 702, 703, 705 and 707 based on the output data signal 716 and the respective clocks 799, 798, 797 and 796. The RZ latch 706 of the branch 720 may receive the output data signal 716 and, in accordance with the clock 799, may produce the first RZ data signal 702. The RZ latch 706 of the branch 721 may receive the output data signal 716 and, in accordance with the clock 798, may produce the second RZ data signal 703. The RZ latch 706 of the branch 722 may receive the output data signal 716 and, in accordance with the clock 797, may produce the third RZ data signal 705. The RZ latch 706 of the branch 723 may receive the output data signal 716 and, in accordance with the clock 796, may produce the fourth RZ data signal 707.

As previously mentioned, the RZ latches 706 may be driven by the respective clocks 799, 798, 797 and 796, which are of quarter the rate of the clock driving the full-rate data signal 701, and may used to sample the output data signal 716 of the summing circuit 712.

In yet another example of the operation 1304, the quarter-rate mux-less DFE 800 depicted in FIG. 8 produces the first, second, third and fourth RZ data signals 802, 803, 805 and 807 based on the output data signal 816 and the respective clocks 899, 898, 897 and 896 similarly to how the quarter-rate mux-less DFE 700 depicted produces the first, second, third and fourth RZ data signals 702, 703, 705 and 707 based on the output data signal 716 and the respective clocks 799, 798, 797 and 796.

In other embodiments of the present technology, the method 1300 may comprise a sub-operation 1334 where a given 1/K-rate mux-less DFE may produce K given RZ data signals based on respective given output data signals and a given clock.

For example, in the sub-operation 1334, the half-rate mux-less DFE 500 depicted in FIG. 5 produces (i) the event RZ data signal 502 based on the output data signal 516 and the clock 599 and (ii) the odd RZ data signal 503 based on the output data signal 517 and the clock 599. The RZ latch 506 of the branch 520 may receive the output data signal 516 and, in accordance with the clock 599, may produce the even RZ data signal 502 while the RZ latch 506 of the branch 521 may receive the output data signal 517 and, in accordance with the clock 599, may produce the odd RZ data signal 503.

It is contemplated that the method 1300 may comprise a sub-operation 1324 where the RZ latches 506 may be driven on opposite phases of the clock 599.

It is contemplated that the method 1300 may comprise a sub-operation 1344 where a given 1/K-rate mux-less DFE may produce K given RZ data signals based on respective given output data signals and respective given clock.

As previously mentioned, it is contemplated that the RZ latches 506 of the half-rate mux-less DFE 500 may be driven by respective clocks which are phased away from one another by 180 degrees.

In one example of the sub-operation 1344, the quarter-rate mux-less DFE 800 depicted in FIG. 8 produces (i) the first RZ data signal 802 based on the output data signal 816 and the clock 899, (ii) the second RZ data signal 803 based on the output data signal 817 and the clock 898, (iii) the third RZ data signal 805 based on the output data signal 818 and the clock 897 and (iv) the fourth RZ data signal 807 based on the output data signal 819 and the clock 896.

In another example of the sub-operation 1344, the quarter-rate mux-less DFE 1000 depicted in FIG. 10 produces (i) the first RZ data signal 1002 based on the output data signal 1016 and the clock 1099, (ii) the second RZ data signal 1003 based on the output data signal 1017 and the clock 1098, (iii) the third RZ data signal 1005 based on the output data signal 1018 and the clock 1097 and (iv) the fourth RZ data signal 1007 based on the output data signal 1019 and the clock 1096.

In yet another example of the sub-operation 1344, the quarter-rate mux-less DFE 1200 depicted in FIG. 12 produces (i) the first RZ data signal 1202 based on the output data signal 1216 and the clock 1299, (ii) the second RZ data signal 1203 based on the output data signal 1217 and the clock 1298, (iii) the third RZ data signal 1205 based on the output data signal 1218 and the clock 1297 and (iv) the fourth RZ data signal 1207 based on the output data signal 1219 and the clock 1296.

It is contemplated that the method 1300 may comprise an operation 1314 during which a given clock may be operated at a half duty cycle (50% duty cycle). For example, the clocks 299, 399, 599 and 1299 are operated by the respective DFEs 200, 300, 500 and 1200 at the half duty cycle. This means that the respective RZ latches (i) 206, (ii) 306, (iii) 506 and (iv) 1206, respectively, are driven by the clocks (i) 299, (ii) 399, (iii) 599 and (iv) 1299, 1298, 1297 and 1296, respectively, to sample the output data signals (i) 216, (ii) 316, (iii) 516 and 517 and (iv) 1216, 1217, 1218 and 1219, respectively, during a half of each cycle of the respective clocks (i) 299, (ii) 399, (iii) 599 and (iv) 1299, 1298, 1297 and 1296.

It is contemplated that the method 1300 may comprise the operation 1314 during which a given clock may be operated at a quarter duty cycle (25% duty cycle). For example, the clocks 799, 798, 797, 796, 899, 898, 897, 896, 1099, 1098, 1097 and 1096 are operated by the respective mux-less DFEs 700, 800 and 1000 at the quarter duty cycle. This means that the respective RZ latches (i) 706, (ii) 806 and (iii) 1006 are driven by the respective clocks (i) 799, 798, 797 and 796, (ii) 899, 898, 897 and 896 and (iii) 1099, 1098, 1097 and 1096 to sample the respective output data signals (i) 716, (ii) 816 and (iii) 1016, 1017, 1018 and 1019 during a quarter of each cycle of the respective clocks (i) 799, 798, 797 and 796, (ii) 899, 898, 897 and 896 and (iii) 1099, 1098, 1097 and 1096.

It is also contemplated that if given clocks are high 75% of the time, given RZ latches of given 1/K-rate mux-less DFEs may operate according to the falling edges of the respective clocks.

The method 1300 continues to operation 1306 with a given 1/K-rate mux-less DFE producing each of K given ISI cancellation signals based on a respective given one of K given RZ data signals.

For example, in operation 1306, the half-rate mux-less DFE 200 depicted in FIG. 2 produces the ISI cancellation signals 214 and 215 based on the respective even and odd RZ data signals 202 and 203. In another example of the operation 1306, the half-rate mux-less DFE 300 depicted in FIG. 3 produces the ISI cancellation signals 314 and 315 based on the respective even and odd RZ data signals 302 and 303. In yet another example of the operation 1306, the half-rate mux-less DFE 500 depicted in FIG. 5 produces the ISI cancellation signals 514 and 515 based on the respective even and odd RZ data signals 502 and 503. In a further example of the operation 1306, the quarter-rate mux-less DFE 700 depicted in FIG. 7 produces the ISI cancellation signals 714, 715, 724 and 725 based on the respective first, second, third and fourth RZ data signals 702, 703, 705 and 707. In an additional example of the operation 1306, the quarter-rate mux-less DFE 800 depicted in FIG. 8 produces the ISI cancellation signals 814, 815, 824 and 825 based on the respective first, second, third and fourth RZ data signals 802, 803, 805 and 807. In an alternative example of the operation 1306, the quarter-rate mux-less DFE 1000 depicted in FIG. 10 produces the ISI cancellation signals 1014, 1015, 1024 and 1025 based on the respective first, second, third and fourth RZ data signals 1002, 1003, 1005 and 1007.

In a distinct example of the operation 1306, the quarter-rate mux-less DFE 1200 depicted in FIG. 1200 produces the ISI cancellation signals 1214, 1215, 1224 and 1225 based on the respective first, second, third and fourth RZ data signals 1202, 1203, 1205 and 1207. In this example, the quarter-rate mux-less DFE, 1200 producing the ISI cancellation signals 1214, 1215, 1224 and 1225, based on the respective first, second, third and fourth RZ data signals 1202, 1203, 1205 and 1207, comprises the quarter-rate mux-less DFE 1200 producing the modified RZ data signals 1290, 1291, 1292 and 1293 based on the respective first, second, third and fourth RZ data signals 1202, 1203, 1205 and 1207 and the respective clock signals 1281, 1282, 1283 and 1284 and producing the ISI cancellation signals 1214, 1215, 1224 and 1225 based on the modified RZ data signals 1290, 1291, 1292 and 1293.

It is contemplated that the operation 1306 may comprise in a sub-operation 1326 for filtering by a given 1/K-rate mux-less DFE each one of K given RZ data signals in order to produce respective K given ISI cancellation signals.

For example, in the sub-operation 1326, the half-rate mux-less DFE 200 depicted in FIG. 2 may filter the even and odd RZ data signals 202 and 203 by employing the filters 204. Similarly, the half-rate mux-less DFEs 300 and 500 depicted in FIGS. 3 and 5, respectively, may filter the even and odd RZ data signals 302 and 303 as well as the even and odd RZ data signals 502 and 503, respectively, by employing the filters 304 and 504, respectively. Similarly, the quarter-rate mux-less DFEs (i) 700, (ii) 800, (iii) 1000 depicted in FIGS. 7, 8 and 10, respectively, may filter the first, second, third and fourth RZ data signals (i) 702, 703, 705 and 707, (ii) 802, 803, 805 and 807 and (iii) 1002, 1003, 1005 and 1007, respectively, by using the filters (i) 704, (ii) 804 and (iii) 1104.

It is contemplated that the quarter-rate mux-less DFE 1200 depicted in FIG. 12 filters the modified RZ data signals 1290, 1291, 1292 and 1293 by employing the filters 1204, instead of filtering the RZ data signals 1202, 1203, 1205 and 1207.

It is contemplated that the method 1300 may also comprise an operation 1308 for outputting K given RZ data signals by a given 1/K-rate mux-less DFE. For example, the half-rate mux-less DFE 200 may output the even and odd RZ data signals 202 and 203. In another example, the quarter-rate mux-less DFE 700 may output the first, second, third and fourth RZ data signals 702, 703, 705 and 707.

It is contemplated that the method 1300 may also comprise an operation 1310 for producing by a given 1/K-rate mux-less DFE K given NRZ data signals based on respective K given RZ data signals. For example, the half-rate mux-less DFEs (i) 300 and (ii) 500, respectively, may produce the even and odd NRZ data signals (i) 330 and 331 and (ii) 530 and 531, respectively, based on the even and odd RZ data signals (i) 302 and 303 and (ii) 502 and 503, respectively. In a further example, the quarter-rate mux-less DFEs (i) 800, (ii) 1000, (iii) 1200, respectively, may produce the first, second, third and fourth NRZ data signals (i) 830, 831, 832 and 833, (ii) 1030, 1031, 1032 and 1033 and (iii) 1230, 1231, 1232 and 1233, respectively, based on the first, second, third and fourth RZ data signals (i) 802, 803, 805 and 807, (ii) 1002, 1003, 1005 and 1007 and (iii) 1202, 1203, 1205 and 1207, respectively.

It is contemplated that the method 1300 may also comprise an operation 1312 for outputting by a given 1/K-rate mux-less DFE K given NRZ data signals. For example, the half-rate mux-less DFEs (i) 300 and (ii) 500, respectively, may output the even and odd NRZ data signals (i) 330 and 331 and (ii) 530 and 531, respectively. In a further example, the quarter-rate mux-less DFEs (i) 800, (ii) 1000, (iii) 1200, respectively, may output the first, second, third and fourth NRZ data signals (i) 830, 831, 832 and 833, (ii) 1030, 1031, 1032 and 1033 and (iii) 1230, 1231, 1232 and 1233, respectively.

Those of ordinary skill in the art will realize that the description of various 1/K-rate mux-less DFEs and various methods of decision feedback equalization are illustrative only and are not intended to be in any way limiting. Other embodiments will readily suggest themselves to such persons with ordinary skill in the art having the benefit of the present disclosure. Furthermore, at least some of the disclosed 1/K-rate mux-less DFEs and/or at least some of the disclosed methods of decision feedback equalization may be customized to offer valuable solutions to existing needs and problems related to ISI at high-data rates. In the interest of clarity, not all of the routine features of the implementations of the at least some of the disclosed 1/K-rate mux-less DFEs and/or at least some of the disclosed methods of decision feedback equalization are shown and described. In particular, combinations of features are not limited to those presented in the foregoing description as combinations of elements listed in the appended claims form an integral part of the present disclosure. It will, of course, be appreciated that in the development of any such actual implementation of the at least some of the disclosed 1/K-rate mux-less DFEs and/or at least some of the disclosed methods of decision feedback equalization, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of feedback equalization at high-data rates having the benefit of the present disclosure.

In accordance with the present disclosure, the components, process operations, and/or data structures described in herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

It is contemplated that the 1/K-rate mux-less DFEs may be implemented in a plethora of devices that use SerDes interfaces for communication and other data transmission purposes. SerDes interfaces may be used in wired and/or wireless network routers, fiber optics communication systems, data-storage devices and the like. The 1/K-rate mux-less DFEs may be implemented in wired and/or wireless communication devices such as smartphones and tablets, for example, for aiding in transmitting information to and/or from various integrated circuitries thereof. For example, the 1/K-rate mux-less DFEs may aid in transmitting information to and/or from radio frequency integrated circuits (RFICs). The 1/K-rate mux-less DFEs may be implemented in base stations used for mobile telephony, wireless computer networking and other wireless communications. The 1/K-rate mux-less DFEs may be implemented into Universal Serial Bus (USB) circuitries, High-Definition Multimedia Interface (HDMI) circuitries, and the like. It should be noted, however, that various devices that may implement the 1/K-rate mux-less DFEs are non-exhaustively listed above as examples only and are not intended to be an exhaustive list of devices that may implement the 1/K-rate mux-less DI-Bs. Other devices to those non-exhaustively listed above may implement the 1/K-rate mux-less DFEs in other implementations of the present technology, without departing from the scope of the present technology.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:

1. A 1/K-rate decision feedback equalizer (DFE), the DFE comprising:
    a summing circuit configured to combine K intersymbol interference (ISI) cancellation signals with an input signal of the DFE;
    K branches, each branch including:
        a reset-to-zero (RZ) latch configured to receive an output signal of the summing circuit according to a clock signal and to produce a RZ signal; and
        a feedback circuit including:
            K filters, each filter being configured to:
                receive a respective RZ signal from a respective RZ latch; and
                produce a respective ISI cancellation signal from the respective RZ signal.

2. The DFE of claim 1, wherein two of the RZ latches are driven on opposite phases of the clock signal.

3. The DFE of claim 1, wherein each branch further includes a set-reset (SR) latch configured to receive the RZ signal of that branch.

4. The DFE of claim 3, wherein:
    the DFE comprises two branches;
    the respective RZ latches of a first and second one of the two branches are configured to receive first and second output signals from the summing circuit, respectively, according to the clock signal operating at a half duty cycle;
    the feedback circuit further comprises:
        a first feedback loop for the first one of the two branches configured for providing a first feedback tap signal from the SR latch of the second one of the two branches to the summing circuit, the summing circuit being further configured to combine the first feedback tap signal with the input signal of the DFE and with the two ISI cancellation signals for producing the first output signal of the summing circuit; and
        a second feedback loop for the second one of the two branches configured for providing a second feedback tap signal from the SR latch of the first one of the two branches to the summing circuit, the summing circuit being further configured to combine the second feedback tap signal with the input signal of the DFE and with the two ISI cancellation signals for producing the second output signal of the summing circuit.

5. The DFE of claim 4, wherein the first and the second feedback tap signals are non-return-to-zero (NRZ) signals.

6. The DFE of claim 3, wherein:
    the DFE comprises four branches;
    each of the four RZ latches is configured to receive a respective output of the summing circuit according to the clock signal operating at a quarter duty cycle; and
    the feedback circuit further comprises, for each one of the four branches, a respective feedback loop configured for providing a respective feedback tap signal from the SR latch of at least one other of the four branches to the summing circuit, the summing circuit being configured to combine the respective feedback tap signal with the input signal of the DFE and with the four ISI cancellation signals for producing the respective output signal of the summing circuit.

7. The DFE of claim 1, wherein:
    the DFE comprises four branches;
    each of the four RZ latches is configured to receive a respective output signal of the summing circuit according to the clock signal operating at a half duty cycle;
    the feedback circuit further comprises, for each one of the four branches:
        an AND-gate configured to receive the respective RZ signal according to an other clock signal and to output a respective modified RZ signal, the other clock signal being such that the respective modified RZ signal is reset to a zero-reference voltage for three quarters of a cycle of the clock signal, and
        a respective feedback loop configured for providing a respective feedback tap signal from the RZ latch of at least one other of the four branches to the summing circuit, the summing circuit being further configured to combine the respective feedback tap signal with the input signal of the DFE and with the four ISI cancellation signals for producing the respective output of the summing circuit; and
    each of the four filters is configured to receive the respective modified RZ signal from the respective AND-gate and to produce the respective ISI cancellation signal from the respective modified RZ signal.

8. The DFE of claim 1, wherein each one of the plurality of filters is a passive filter.

9. The DFE of claim 1, wherein each one of the plurality of filters is an infinite impulse response (IIR) filter.

10. A method implemented in a 1/K-rate decision feedback equalization (DFE) circuit comprising K branches, the method comprising:
   producing, by the DFE circuit, an output signal for the K branches based on K intersymbol interference (ISI) cancellation signals and on an input signal of the DFE circuit;
   producing, by the DFE circuit, K return-to-zero (RZ) signals based on the output signal and on a clock signal; and
   producing, by the DFE circuit, each of the K ISI cancellation signals based on a respective one of the K RZ signals.

11. The method of claim 10, wherein producing each of the K ISI cancellation signals comprises filtering, by the DFE circuit, the respective one of the K RZ signals.

12. The method of claim 10, wherein the method further comprises outputting, by the DFE circuit, the K RZ signals.

13. The method of claim 10, wherein the method further comprises producing, by the DFE circuit, each of K non-return-to-zero (NRZ) signals based on a respective one of the K RZ signals.

14. The method of claim 13, wherein the method further comprises outputting, by the DFE circuit, the K NRZ signals.

15. The method of claim 14, wherein:
   producing the output signal further comprises producing, by the DFE circuit, a respective output signal for each given one of the K branches based on the K ISI cancellation signals, on the input signal of the DFE circuit and on the NRZ signal of another given oven one of the K branches; and
   producing the K RZ signals further comprises producing, by the DFE circuit, each one of the K RZ signals based on the respective output signal and on the clock signal.

16. The method of claim 10, wherein producing the K RZ signals based on the output signal and the clock signal further comprises producing, by the DFE circuit, a first one of the K RZ signals based on the output signal and on a first phase of the clock signal and producing, by the DFE circuit, a second one of the K RZ signals based on the output signal and on a second phase of the clock signal, the first and second phases of the clock signal being opposite to one another.

17. The method of claim 10, wherein producing the K RZ signals based on the output signal and on the clock signal further comprises producing, by the DFE circuit, the K RZ signals based on the respective output signals and on respective clock signals.

18. The method of claim 15, wherein the method further comprises operating, by the DFE circuit, the respective clock signals at one of a half duty cycle and a quarter duty cycle.

* * * * *